(12) United States Patent
Ulusoy et al.

(10) Patent No.: US 10,825,217 B2
(45) Date of Patent: Nov. 3, 2020

(54) IMAGE BOUNDING SHAPE USING 3D ENVIRONMENT REPRESENTATION

(71) Applicant: Microsoft Technology Licensing, LLC, Redmond, WA (US)

(72) Inventors: Ali Osman Ulusoy, Seattle, WA (US); Yuri Pekelny, Seattle, WA (US); Szymon Piotr Stachniak, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 16 days.

(21) Appl. No.: 16/238,450

(22) Filed: Jan. 2, 2019

(65) Prior Publication Data
US 2020/0211243 A1 Jul. 2, 2020

(51) Int. Cl.
*G06T 11/60* (2006.01)

(52) U.S. Cl.
CPC .......... *G06T 11/60* (2013.01); *G06T 2200/04* (2013.01); *G06T 2210/12* (2013.01)

(58) Field of Classification Search
CPC .. G06K 9/00664–00704; G06F 3/0481; G06F 3/04817; G06F 9/4443; G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| | | | | |
|---|---|---|---|---|
| 6,061,067 A | * | 5/2000 | Silva | G06F 3/0481 345/619 |
| 10,169,678 B1 | * | 1/2019 | Sachdeva | G06F 3/011 |

(Continued)

OTHER PUBLICATIONS

Newcombe, et al., "KinectFusion: Real-time dense surface mapping and tracking", In Proceedings of 10th IEEE International Symposium on Mixed and Augmented Reality, Oct. 26, 2011, 10 Pages.
(Continued)

*Primary Examiner* — Todd Buttram
(74) *Attorney, Agent, or Firm* — Alleman Hall Creasman & Tuttle LLP

(57) ABSTRACT

A computing system is provided, including one or more optical sensors, a display, one or more user input devices, and a processor. The processor may receive optical data of a physical environment. Based on the optical data, the processor may generate a three-dimensional representation of the physical environment. For at least one target region of the physical environment, the processor may generate a three-dimensional bounding volume surrounding the target region based on a depth profile measured by the one or more optical sensors and/or estimated by the processor. The processor may generate a two-dimensional bounding shape at least in part by projecting the three-dimensional bounding volume onto an imaging surface of an optical sensor. The processor may output an image of the physical environment and the two-dimensional bounding shape for display. The processor may receive a user input and modify the two-dimensional bounding shape based on the user input.

20 Claims, 15 Drawing Sheets

(56) References Cited

U.S. PATENT DOCUMENTS

| | | | | |
|---|---|---|---|---|
| 2011/0074698 | A1* | 3/2011 | Rapp | G06F 3/0481 |
| | | | | 345/173 |
| 2018/0322687 | A1* | 11/2018 | Kim | G06F 3/012 |
| 2018/0341811 | A1* | 11/2018 | Bendale | G06T 7/593 |
| 2019/0347501 | A1* | 11/2019 | Kim | G06K 9/2054 |
| 2020/0027229 | A1* | 1/2020 | Shen | G06K 9/6211 |

OTHER PUBLICATIONS

Lorensen, et al., "Marching cubes: A high resolution 3D surface construction algorithm", In Proceedings of the 14th annual conference on Computer graphics and interactive techniques, vol. 21, No. 4, Jul. 1987, pp. 163-169.

Klein, et al., "Parallel Tracking and Mapping for Small AR Workspaces", In Proceedings of the 6th IEEE and ACM International Symposium on Mixed and Augmented Reality, Nov. 13, 2007, 10 Pages.

Kazhdan, et al., "Poisson surface reconstruction", In Proceedings of the fourth Eurographics symposium on Geometry processing, Jun. 26, 2006, 10 Pages.

Tateno, et al., "Real-Time and Scalable Incremental Segmentation on Dense SLAM", In Proceedings of IEEE/RSJ International Conference on Intelligent Robots and Systems, Sep. 28, 2015, 8 Pages.

Gaidon, et al. ,"Virtual Worlds as Proxy for Multi-Object Tracking Analysis", In Repository of arXiv: 1605.06457, May 20, 2016, 10 Pages.

Geiger, et al., "Vision Meets Robotics: The Kitti Dataset", In the International Journal of Robotics Research, vol. 32, Issue 11, Aug. 23, 2013, pp. 1231-1237.

Hu, et al., "A Combined Clustering and Image Mapping Based Point Cloud Segmentation for 3D Object Detection", In Proceedings of the Chinese Control and Decision Conference, Jun. 9, 2018, pp. 1664-1669.

"International Search Report and Written Opinion Issued in PCT Application No. PCT/US2019/068456", dated Mar. 16, 2020, 18 Pages.

Ruchti, et al., "Mapping with Dynamic-Object Probabilities Calculated from Single 3D Range Scans", In Proceedings of the IEEE International Conference on Robotics and Automation, May 21, 2018, pp. 6331-6336.

Siam, et al., "Modnet: Moving Object Detection Network with Motion and Appearance for Autonomous Driving", In Repository of arXiv: 1709.04821v1, Nov. 12, 2017, 7 Pages.

* cited by examiner

IMAGE BOUNDING SHAPE USING 3D ENVIRONMENT REPRESENTATION

BACKGROUND

Image recognition using machine learning has come to be used for an increasingly wide range of applications, such as vehicle navigation and medical data analysis. Machine learning algorithms for image recognition are generated using sets of training data. Typically, the training data sets include large numbers of tagged images. The generation of useful training data sets can be technically challenging, time consuming, and costly.

SUMMARY

According to one aspect of the present disclosure, a computing system is provided, including one or more optical sensors, a display, one or more user input devices, and a processor. The processor may be configured to receive optical data of a physical environment from the one or more optical sensors. Based at least in part on the optical data, the processor may be further configured to generate a three-dimensional representation of the physical environment. For at least one target region of the physical environment, the processor may be further configured to generate a three-dimensional bounding volume surrounding the target region based on a depth profile of the target region that is measured by the one or more optical sensors and/or estimated by the processor. The processor may be further configured to generate a two-dimensional bounding shape at least in part by projecting the three-dimensional bounding volume onto an imaging surface of an optical sensor of the one or more optical sensors. The processor may be further configured to output an image of the physical environment and the two-dimensional bounding shape for display on the display. The processor may be further configured to receive a user input via the one or more user input devices and modify the two-dimensional bounding shape based on the user input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Many applications of image recognition require specialized sets of training data, which may not be widely available and may have to be custom-generated. Custom-generating a training data set typically requires user feedback to annotate images. When the images in a training data set for a machine learning algorithm have to be manually tagged by a user, generating the training data set may be expensive and time-consuming. Costs associated with manually tagging large numbers of images limit the range of applications for which image recognition algorithms are practical to use.

Figure 1:
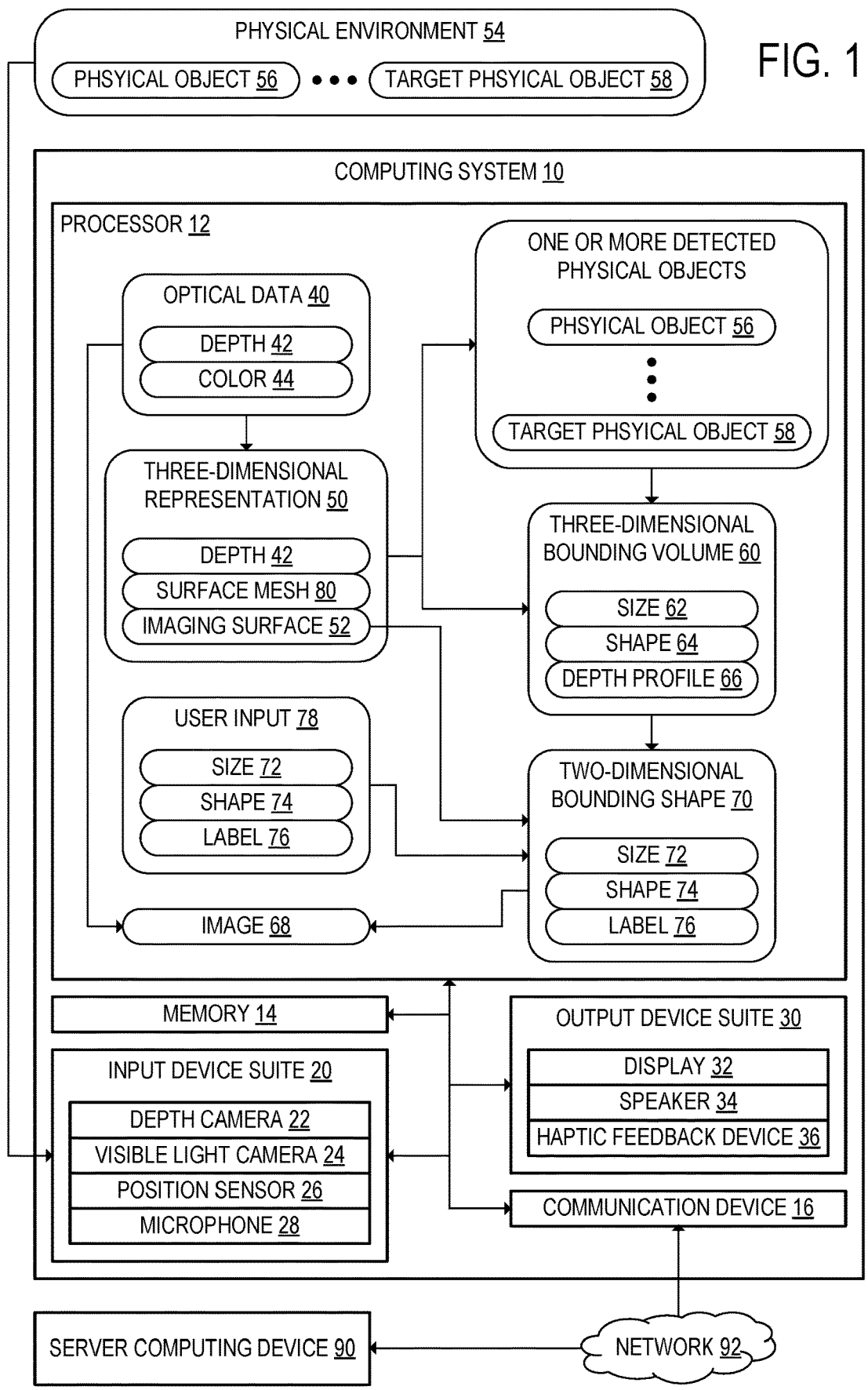
FIG. 1 schematically depicts an example computing system, according to one embodiment of the present disclosure.

In order to address the problems discussed above, the inventors have conceived of the following systems and methods, which may be used to annotate images and generate training data sets. FIG. 1 shows a computing system 10, according to one embodiment of the present disclosure. The computing system 10 may include a processor 12, which may be operatively coupled to memory 14. The memory 14 may include volatile memory and/or non-volatile memory. Although one processor 12 is shown in FIG. 1, the functions of the processor 12 may be divided between a plurality of processors in some embodiments.

The computing system 10 may further include an input device suite 20 including one or more optical sensors configured to collect image data 40 of a physical environment 54. The one or more optical sensors may include a depth camera 22 in some embodiments. For example, the depth camera 22 may be an infrared time-of-flight camera. Additionally or alternatively, the one or more optical sensors may include a visible light camera 24. For example, the visible light camera may be an RGB, CMYK, or grayscale camera. The one or more optical sensors may include one or more combined depth and visible light image sensors configured to act as both the depth camera 22 and the visible light camera 24. Other types of optical sensor may be included in the input device suite 20 in other embodiments.

In addition to the one or more optical sensors, the input device suite 20 may further include a position sensor 26 configured to detect a spatial orientation of the computing system 10. The position sensor 26 may be further configured to detect motion of the computing system 10. The input device suite 20 may further include one or more microphones 28 configured to collect sound data. One or more other types of input devices may be included in the input device suite 20 in other embodiments. Some or all of the input devices included in the input device suite 20 may function as one or more user input devices via which a user may make one or more user inputs to the processor 12.

The computing system 10 may further include an output device suite 30, which may include a display 32. The output device suite 30 may further include one or more speakers 34 and/or one or more haptic feedback devices 36. One or more other types of output devices may be included in the output device suite 30 in other embodiments.

The computing system 10 may further include one or more communication devices 16, which may include one or more wired and/or wireless transmitters and/or receivers. Via the one or more communication devices 16, the processor 12 may be configured to communicate with one or more other computing systems. For example, the processor 12 may communicate with a server computing system 90 via a network 92. The functions of the processor 12, memory 14, input device suite 20, and/or output device suite 30 may be distributed between a plurality of devices that instantiate the computing system 10. For example, one or more steps described below as occurring at the processor 12 may be performed at the server computing system 90.

Figure 2:
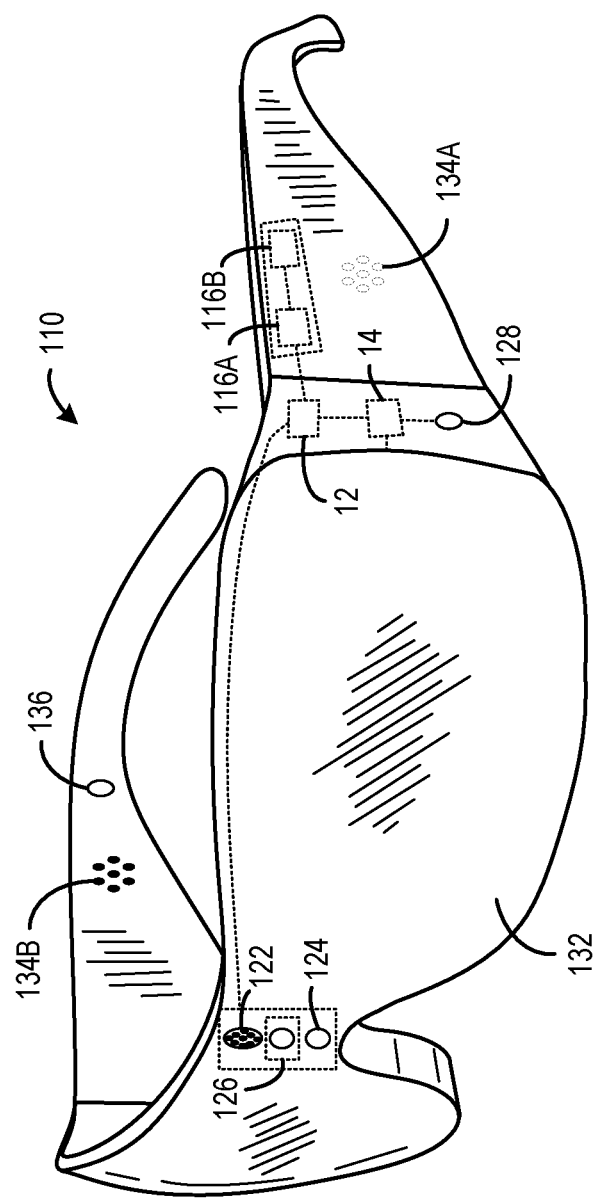
FIG. 2 shows the example computing system of FIG. 1 in the form of wearable glasses or goggles.

FIG. 2 shows an example embodiment of the computing system 10 in which the computing system 10 is a head-mounted display device 110 having the form of wearable glasses or goggles, but it will be appreciated that other forms are possible. The head-mounted display device 110 may include an output device suite including a display 132. In some embodiments, the head-mounted display device 110 may be configured in an augmented reality configuration to present an augmented reality environment, and thus the display 132 may be an at least partially see-through stereoscopic display configured to visually augment an appearance of a physical environment 54 being viewed by the user through the display 120. In some examples, the display 120 may include one or more regions that are transparent (e.g. optically clear) and may include one or more regions that are opaque or semi-transparent. In other examples, the display 120 may be transparent (e.g. optically clear) across an entire usable display surface of the display 120.

The output device suite 30 of the head-mounted display device 110 may, for example, include an image production system that is configured to display one or more virtual objects to the user with the display 132. The processor 12 may be configured to output for display on the display 132 a mixed reality experience including one or more virtual objects superimposed upon the physical environment 54. In the augmented reality configuration with an at least partially see-through display, the virtual objects are visually superimposed onto the physical environment 54 that is visible through the display 132 so as to be perceived at various depths and locations. In one embodiment, the head-mounted display device 110 may use stereoscopy to visually place a virtual object at a desired depth by displaying separate images of the virtual object to both of the user's eyes. Using this stereoscopy technique, the head-mounted display device 110 may control the displayed images of the virtual objects, such that the user will perceive that the virtual objects exist at a desired depth and location in the viewed physical environment 54.

Alternatively, the head-mounted display device 110 may be configured in a virtual reality configuration to present a full virtual reality environment, and thus the display 132 may be a non-see-though stereoscopic display. The head-mounted display device 110 may be configured to display virtual three-dimensional environments to the user via the non-see-through stereoscopic display. The head-mounted display device 110 may be configured to display a virtual representation such as a three-dimensional graphical rendering of the physical environment 54 in front of the user that may include additional virtual objects. Displaying the virtual representation of the physical environment 54 may include generating a two-dimensional projection of a three-dimensional model of the physical environment onto the surface of the display 132. As another alternative, the computing system may include a portable computing device that is not head mounted, such as a smartphone or tablet computing device. In such a device, camera-based augmented reality may be achieved by capturing an image of the physical environment 54 through a forward-facing camera and displaying the captured image on a user-facing display along with world-locked graphical images superimposed on the captured image. While the computing system is primarily described in terms of the head-mounted display device 110 herein, it will be appreciated that many features of the head-mounted display device 110 are also applicable to such a portable computing device that is not head mounted.

The output device suite 30 of the head-mounted display device 110 may further include one or more speakers 134 configured to emit sound. In some embodiments, the head-mounted display device 110 may include at least a left speaker 134A and a right speaker 134B situated such that the left speaker 134A may be located proximate the user's left ear and the right speaker 134B may be located proximate the user's right ear when the head-mounted display device 110 is worn. Thus, the one or more speakers 134 may emit stereo sound output. The output device suite may further include one or more haptic feedback devices 136 configured to provide tactile output (e.g., vibration).

The head-mounted display device 110 may include an input device suite 20 including one or more input devices. The input device suite of the head-mounted display device 110 may include one or more optical sensors. In one example, the input device suite 20 includes an outward-facing optical sensor 122 that may be configured to detect the real-world background from a similar vantage point (e.g., line of sight) as observed by the user through the display 132 in an augmented reality configuration. The input device suite 20 may additionally include an inward-facing optical sensor 124 that may be configured to detect a gaze direction of the user's eyes. It will be appreciated that the outward facing optical sensor 122 and/or the inward-facing optical sensor 124 may include one or more component sensors, including an visible light camera 24 and a depth camera 22. The visible light camera 24 may be a high definition camera or have another resolution. The depth camera 22 may be configured to project non-visible light and capture reflections of the projected light, and based thereon, generate an image comprised of measured depth data for each pixel in the image. This depth data may be combined with color information from the image captured by the visible light camera 24, into a single image representation including both color data and depth data, if desired.

The input device suite 20 of the head-mounted display device 110 may further include a position sensor system that may include one or more position sensors 126 such as accelerometer(s), gyroscope(s), magnetometer(s), global positioning system(s), multilateration tracker(s), and/or other sensors that output position data as a position, orientation, and/or movement of the relevant sensor. The input device suite may further include one or more microphones 128 configured to collect sound data.

Optical sensor information received from the one or more optical sensors and/or position data received from position sensors 126 may be used to assess a position and orientation of the vantage point of head-mounted display device 110 relative to other environmental objects. For example, the position and orientation of the vantage point may be determined using simultaneous localization and mapping (SLAM). In some embodiments, the position and orientation of the vantage point may be characterized with six degrees of freedom (e.g., world-space X, Y, Z, pitch, roll, yaw). The position and/or orientation may be determined by the processor 12 of the head-mounted display device 110 and/or by an off-board computing system.

Furthermore, the optical sensor information and the position sensor information may be used by the head-mounted display system to perform analysis of the real-world background, such as depth analysis, surface reconstruction, environmental color and lighting analysis, or other suitable operations. In particular, the optical and positional sensor information may be used to create a virtual model of the real-world background. Moreover, the virtual model may be used to determine positions of virtual objects in the virtual space and add additional virtual objects to be displayed to the user at a desired depth and location. Additionally, the optical sensor information received from the one or more optical sensors may be used to identify and track objects in the field of view of the one or more optical sensors. The optical sensors may also be used to identify machine recognizable visual features in the physical environment and use the relative movement of those features in successive frames to compute a frame to frame relative pose change for the head mounted display device 110 within the world space of the virtual model.

The head-mounted display device 110 may further include a communication system including one or more communication devices 16, which may include one or more receivers 116A and/or one or more transmitters 116B. In embodiments in which the head-mounted display device 110 communicates with an off-board computing system, the one or more receivers 116A may be configured to receive data from the off-board computing system, and the one or more transmitters 116B may be configured to send data to the off-board computing system. In some embodiments, the head-mounted display device 110 may communicate with the off-board computing system via a network 92, which may be a wireless local- or wide-area network. Additionally or alternatively, the head-mounted display device 110 may communicate with the off-board computing system via a wired connection. The head-mounted display device 110 may be further configured to communicate with a server computing system 90 via the communication system.

Returning to FIG. 1, the processor 12 may be configured to receive optical data 40 of the physical environment 54 from the one or more optical sensors included in the input device suite 20. The optical data 40 may include data indicating a depth 42 of at least one point in the physical environment 54. For example, the depth 42 may be detected by the depth camera 22 in embodiments in which the input device suite 20 includes a depth camera 22. The optical data 40 may further include data indicating a color 44 of at least one point in the physical environment 54. The color 44 may be detected by the visible light camera 24 in embodiments in which the input device suite 20 includes an visible light camera 24. The optical data 40 may include other forms of optical data in some embodiments.

Based at least in part on the optical data 40, the processor 12 may be further configured to generate a three-dimensional representation 50 of the physical environment 54. The three-dimensional representation 50 of the physical environment 54 may include the respective depth 42 and/or color 44 of at least one point in the physical environment 54 as indicated by the optical data 40. In embodiments in which the one or more optical sensors do not directly measure the depth 42, the processor 12 may be further configured to compute the depth 42 based on the optical data 40. For example, in some embodiments, the input device suite 20 may include two or more stereoscopically arranged optical sensors. Based on a change in the optical data 40 respectively collected by the stereoscopically arranged optical sensors over time, the processor 12 may triangulate a distance to at least one point in the physical environment 54 imaged by the stereoscopically arranged optical sensors.

The three-dimensional representation 50 of the physical environment 54 may further include an imaging surface 52 of an optical sensor of the one or more optical sensors. "Imaging surface" is defined here as a virtual surface representing an area of a three-dimensional physical environment viewed by at least one optical sensor. The processor 12 may, in some embodiments, be configured to determine a line of sight of the one or more optical sensors based on the optical data 40. In such embodiments, the imaging surface 52 may be orthogonal to the line of sight. In some embodiments, the imaging surface 52 may be planar. In other embodiments, the imaging surface 52 may be concave or convex. When the input device suite 20 includes a plurality of optical sensors with different lines of sight, the three-dimensional representation 50 may include a respective imaging surface for each optical sensor.

Figure 3:
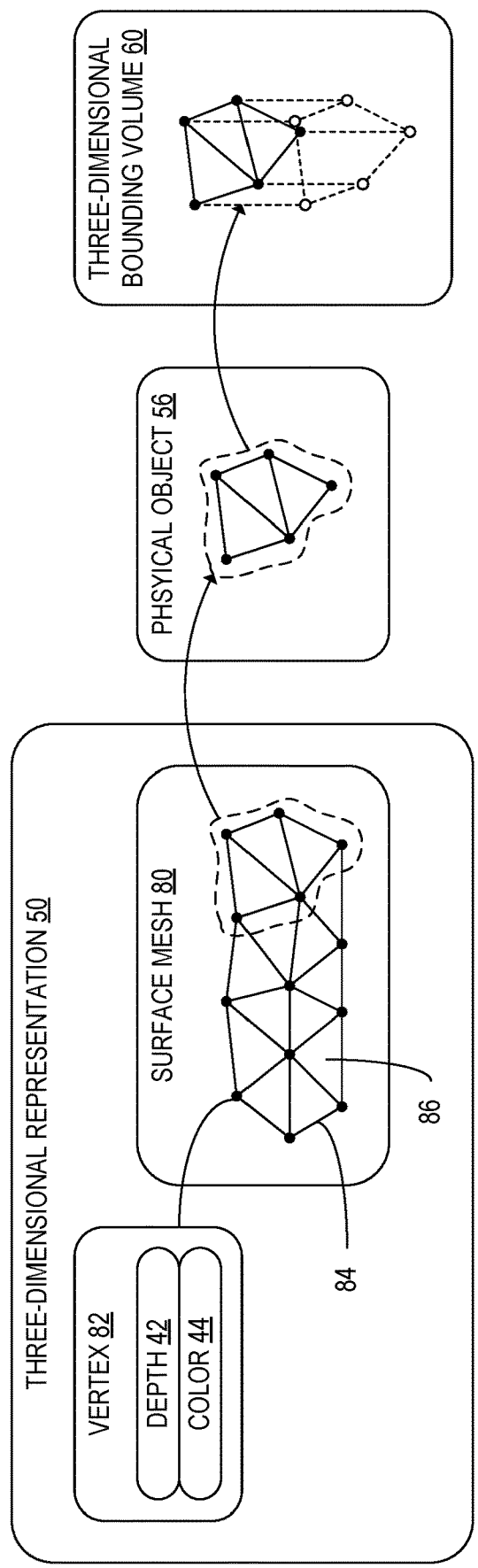
FIG. 3 shows an example surface mesh included in a three-dimensional representation of a physical environment, according to the embodiment of FIG. 1.

The three-dimensional representation 50 of the physical environment 54 may further include a surface mesh 80, as shown in the example of FIG. 3. The surface mesh 80 may include a plurality of vertices 82 connected by a plurality of edges 84 to form a plurality of triangles 86 representing the surface of the physical environment 54. The three-dimensional representation 50 may include a respective depth 42 and/or color 44 associated with each vertex 82 included in the surface mesh 80.

Based on the three-dimensional representation 50, the processor 12 may be further configured to detect one or more physical objects 56 within the physical environment 54. In some embodiments, the one or more physical objects 56 may be detected at least in part by segmenting the surface mesh 80. The surface mesh 80 may be segmented by grouping at least one plurality of vertices included in the surface mesh 80 according to a programmatically executed mesh segmentation algorithm such as K-Means, Random Walks, Fitting Primitives, Normalized Cuts, Randomized Cuts, Core Extraction, or Shape Diameter Function. Further, the physical object detection may be aided or implemented by manual user input circling, gesturing to, pointing at, or otherwise identifying a physical object 56 and its bounds, such as a first time when interacting with a physical object 56. It will be appreciated that when the processor 12 detects a plurality of physical objects 56 within the physical environment 54, the processor 12 may identify a plurality of groups of vertices 82 in the surface mesh 80 as physical objects 56.

Returning to FIG. 1, at least one region of the physical environment 54 may be selected as a target region. For example, the target region may be a group of vertices 82 included in a surface mesh 80. In embodiments in which the processor 12 is configured to detect one or more physical objects 56, the target region may be or include a physical object 56 that is selected as a target physical object 58. In some embodiments, the target region 58 may be selected in response to a user input 78 received via the one or more user input devices. In embodiments in which a plurality of regions are detected in the physical environment 54, the processor 12 may select a plurality of target regions. For the at least one target region, the processor 12 may be further configured to generate a three-dimensional bounding volume 60 surrounding the target region in the three-dimensional representation 50 of the physical environment 54. The three-dimensional bounding volume 60 may have a size 62 and shape 64 that are set programmatically by the processor 12. The three-dimensional bounding volume 60 may entirely surround the target region. In other embodiments, the three-dimensional bounding volume 60 may surround only a portion of the target region.

In embodiments in which the three-dimensional representation 50 of the physical environment 54 includes a surface mesh 80, the three-dimensional bounding volume 60 may include a plurality of vertices and edges. The plurality of vertices and edges included in the three-dimensional bounding volume 60 in such embodiments may be vertices 82 and edges 84 included in the three-dimensional representation 50 or may alternatively be generated separately by the processor 12. As shown in FIG. 3, at least a portion of the shape 64 of the three-dimensional bounding volume 60 may be a shape of the target region as detected in the surface mesh 80.

The three-dimensional bounding volume 60 may be generated based at least in part on a depth profile 66 that characterizes the depth of the target region relative to the one or more optical sensors. The depth profile 66 may be measured by the one or more optical sensors and/or estimated by the processor 12. In embodiments in which the three-dimensional representation 50 of the physical environment 54 includes a surface mesh 80, the depth profile 66 may include a depth 42 of at least one vertex 82 included in the target region. When the depth profile 66 includes respective depths 42 of a plurality of vertices 82, the depth profile 66 may include a mean depth or median depth of the plurality of vertices 82. In some embodiments, the processor 12 may be configured to estimate a center of mass of a target physical object 58 and include a depth of the estimated center of mass in the depth profile 66. In some embodiments, the processor 12 may generate the three-dimensional bounding volume 60 based on the depth profile 66 at least in part by locating at least one vertex of the three-dimensional bounding volume 60 at a depth 42 indicated in the depth profile 66 of the target region.

The processor 12 may be further configured to generate a two-dimensional bounding shape 70 from the three-dimensional bounding volume 60. The processor 12 may programmatically determine a size 72 and/or shape 74 of the two-dimensional bounding shape 70. In some embodiments, the two-dimensional bounding shape 70 may be a rectangular bounding box. The two-dimensional bounding shape 70 may have some other shape (e.g. a triangle or ellipse) in other embodiments. The two-dimensional bounding shape 70 may, in some embodiments, have the shape 64 of the three-dimensional bounding volume 60 as seen from the position of an optical sensor of the one or more optical sensors.

The processor 12 may be configured to generate the two-dimensional bounding shape 70 at least in part by projecting the three-dimensional bounding volume 60 onto the imaging surface 52 of an optical sensor of the one or more optical sensors. Thus, the processor 12 may be configured to "flatten" the three-dimensional bounding volume 60 when generating the two-dimensional bounding shape 70. In embodiments in which the two-dimensional bounding shape 70 has the shape 64 of the three-dimensional bounding volume 60 as seen from the position of an optical sensor, the two-dimensional bounding shape 70 may be the projection of the three-dimensional bounding volume 60 onto the imaging surface 52. In other embodiments, the processor 12 may be further configured to generate some other shape 74 for the two-dimensional bounding shape 70 that encloses the projection.

In embodiments in which the processor 12 is configured to detect one or more physical objects 56, the processor 12 may be further configured to programmatically generate a label 76 for the two-dimensional bounding shape 70 based on the detection of the one or more physical objects 56. For example, the label 76 may include text identifying the target physical object 58 and/or one or more properties of the target physical object 58. Additionally or alternatively, the label 76 may include one or more images. Audio data and/or haptic feedback data may be associated with the label 76 in some embodiments. The processor 12 may be configured to generate the label 76 at least in part using an image classification machine learning algorithm.

Figure 4:
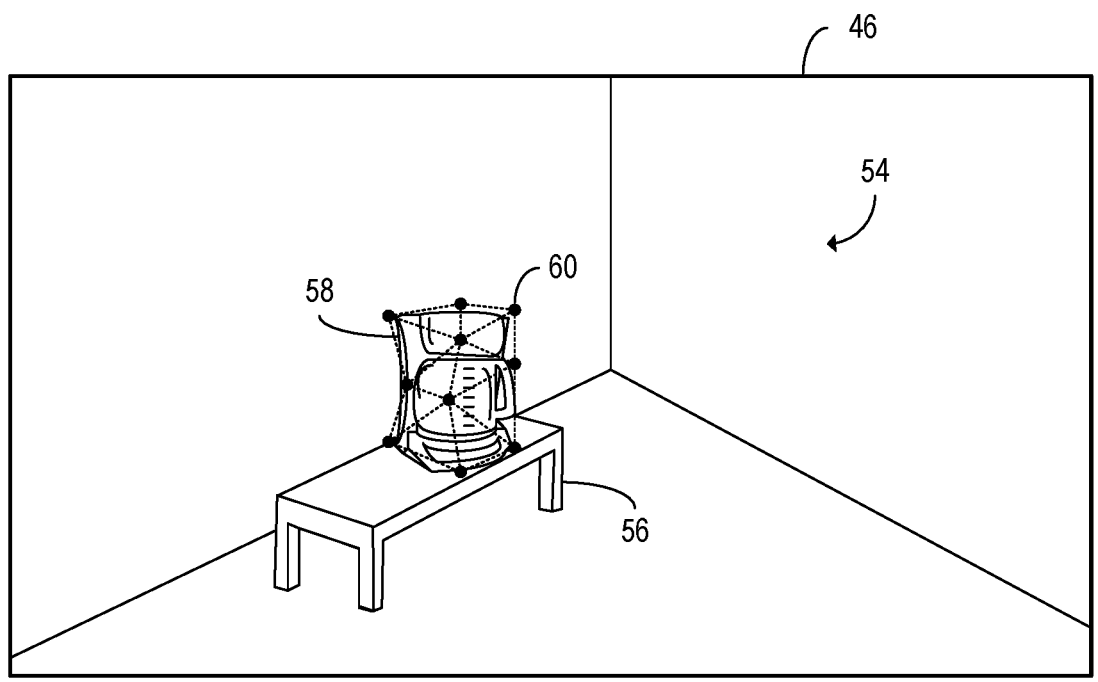
FIG. 4 shows an example unmodified image of a physical environment, according to the embodiment of FIG. 1.

The processor 12 may be further configured to output an image 68 of the physical environment 54 and the two-dimensional bounding shape 70 for display on the display 32. FIG. 4 shows an unmodified image 46 of the physical environment 54 that does not include the two-dimensional bounding shape 70. In the unmodified image 46 of FIG. 4, a target physical object 58 (a coffee maker) and another physical object 56 (a bench) are shown. The coffee maker partially occludes the bench in the example of FIG. 4. In addition, FIG. 4 shows the three-dimensional bounding volume 60 that surrounds the coffee maker.

Figure 5:
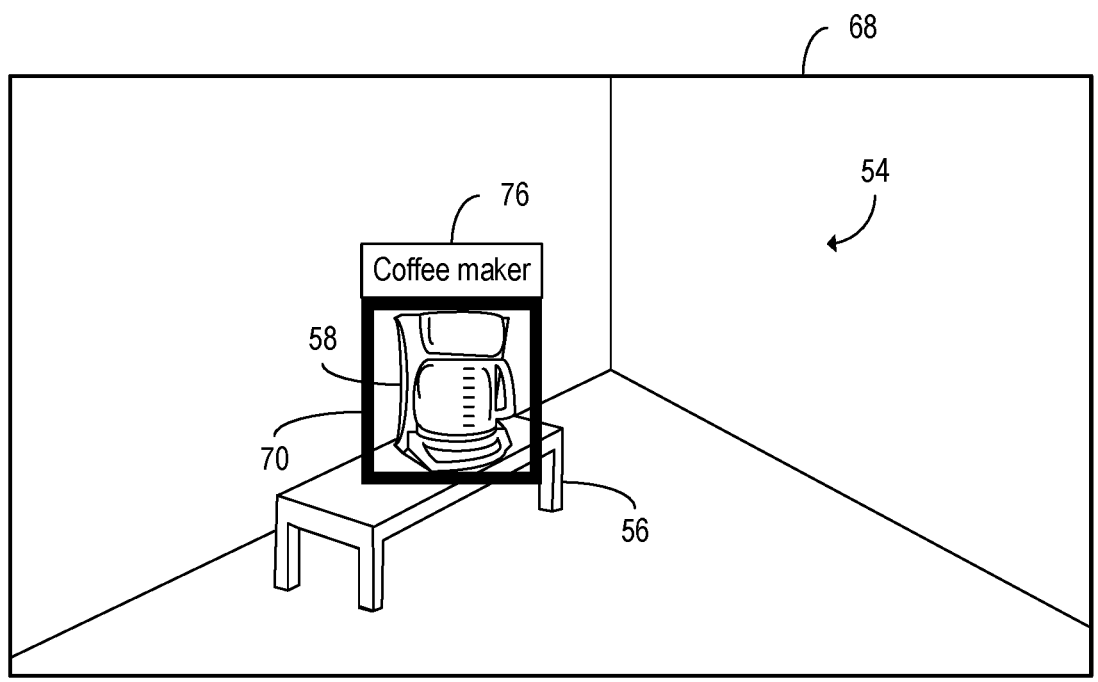
FIG. 5 shows an image of the physical environment of FIG. 4 including a two-dimensional bounding shape, according to the embodiment of FIG. 1.

FIG. 5 shows an image 68 of the physical environment 54 of FIG. 4 that includes the two-dimensional bounding shape 70. In the example of FIG. 5, the two-dimensional bounding shape 70 is a rectangular bounding box surrounding the coffee maker. The image 68 further includes a label 76 that reads "Coffee maker" and is displayed above the coffee maker at the top of the two-dimensional bounding shape 70. Although the label 76 is displayed at the top of the two-dimensional bounding shape 70 in the embodiment of FIG. 5, the label 76 may be displayed in some other location in other embodiments. For example, the label 76 may be displayed at the bottom or side of the two-dimensional bounding shape 70 or may be displayed in a top region or bottom region of the image 68.

Returning to FIG. 1, the processor 12 may be further configured to receive a user input 78 via the one or more user input devices included in the input device suite 20. The user input 78 may be an input to initiate a process of adding a two-dimensional bounding shape 70 to the image 68. For example, the user may add one or more two-dimensional bounding shapes 70 indicating one or more respective physical objects 56 not initially identified by the processor 12. In one example, when the image 68 is displayed on a touchscreen, the user input 78 may be an input drawing a two-dimensional bounding shape around a portion of the image 68. As another example, the user input 78 may include dragging the edges of a rectangular bounding box. In response to receiving such a user input 78, the processor 12 may be further configured to add a two-dimensional bounding shape 70 to the image 68 corresponding to the user input 78. The processor 12 may be further configured to determine a three-dimensional bounding volume 60 based on the two-dimensional bounding shape 70 added via the user input 70.

Figure 6A:
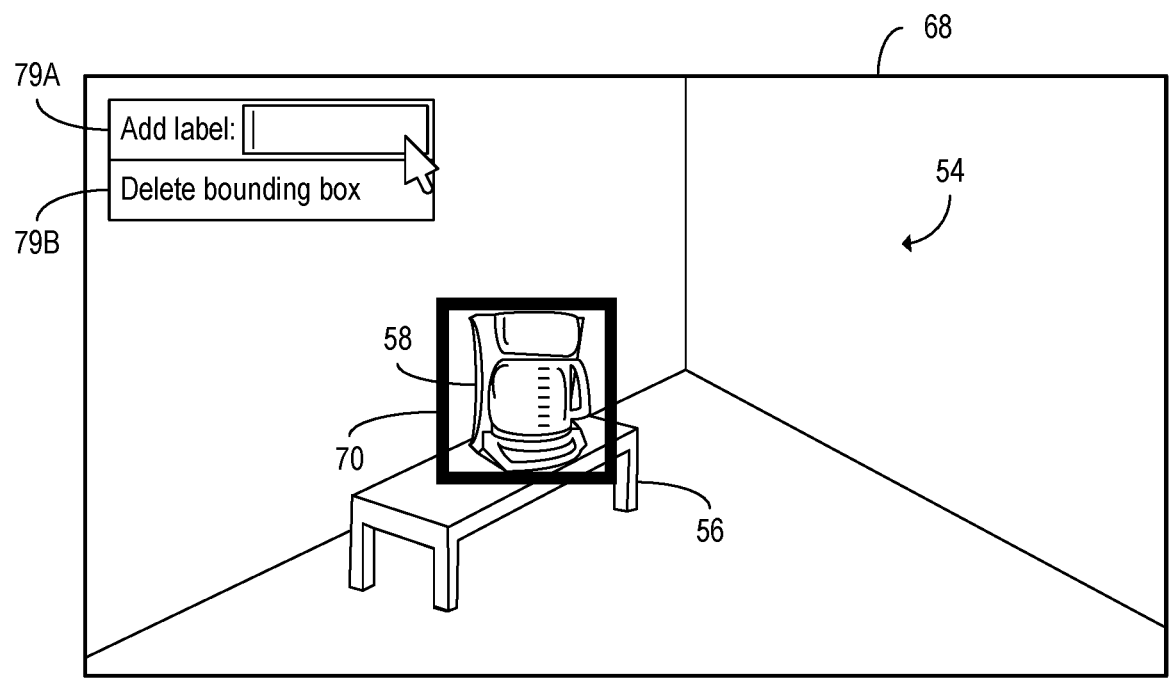
FIGS. 6A-B show an example of adding a label to a two-dimensional bounding shape, according to the example of FIG. 4.
Figure 6B:
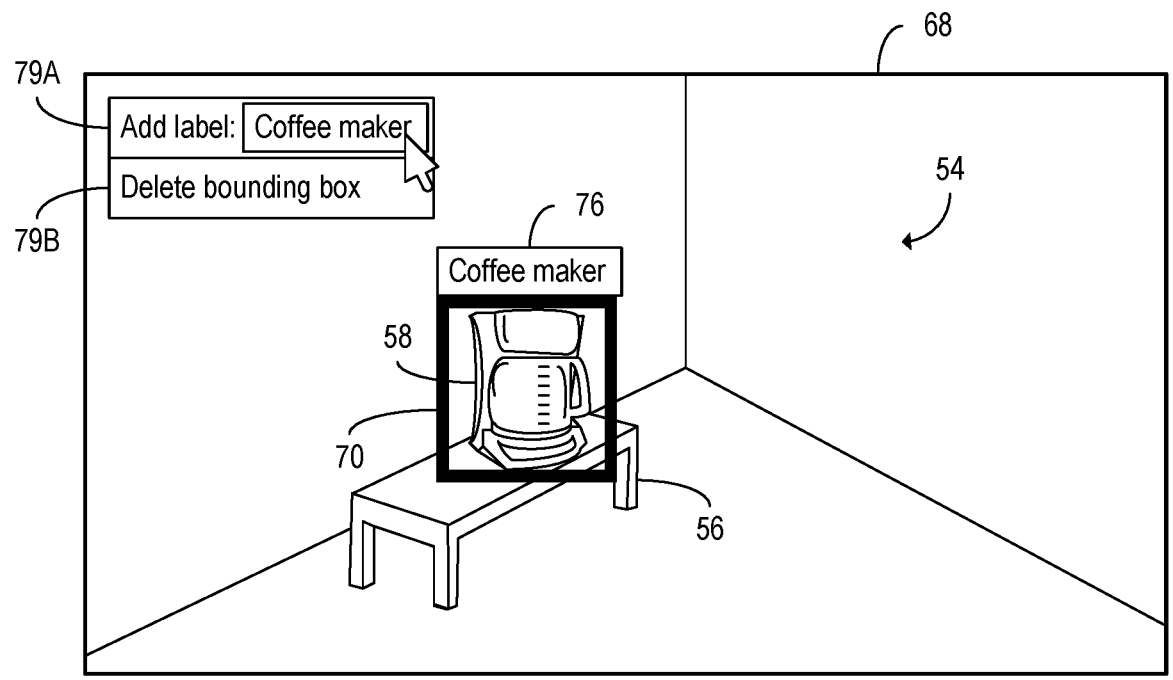

When the image 68 already includes a two-dimensional bounding shape 70, the user input 78 may be an interaction with the two-dimensional bounding shape 70. In response to receiving the user input 78, the processor 12 may be further configured to modify the two-dimensional bounding shape 70 based on the user input 78. For example, the processor 12 may be configured to modify the two-dimensional bounding shape 70 at least in part by adding a label 76 to the two-dimensional bounding shape 70. FIGS. 6A-B show an example in which the processor 12 receives a user input 78 to add a label 76 to the two-dimensional bounding shape 70 that surrounds the coffee maker of FIGS. 4 and 5. In FIG. 6A, the user selects an "Add label" menu item 79A that includes a text entry field. As shown in FIG. 6B, when the user enters the text "Coffee maker" in the text entry field, a label 76 that reads "Coffee maker" is added to the image 68 above the two-dimensional bounding shape 70. When the two-dimensional bounding shape 70 already has a label 76, the two-dimensional bounding shape 70 may be modified in response to the user input 78 at least in part by modifying the label 76, deleting the label 76, or adding an additional label 76.

Figure 7A:
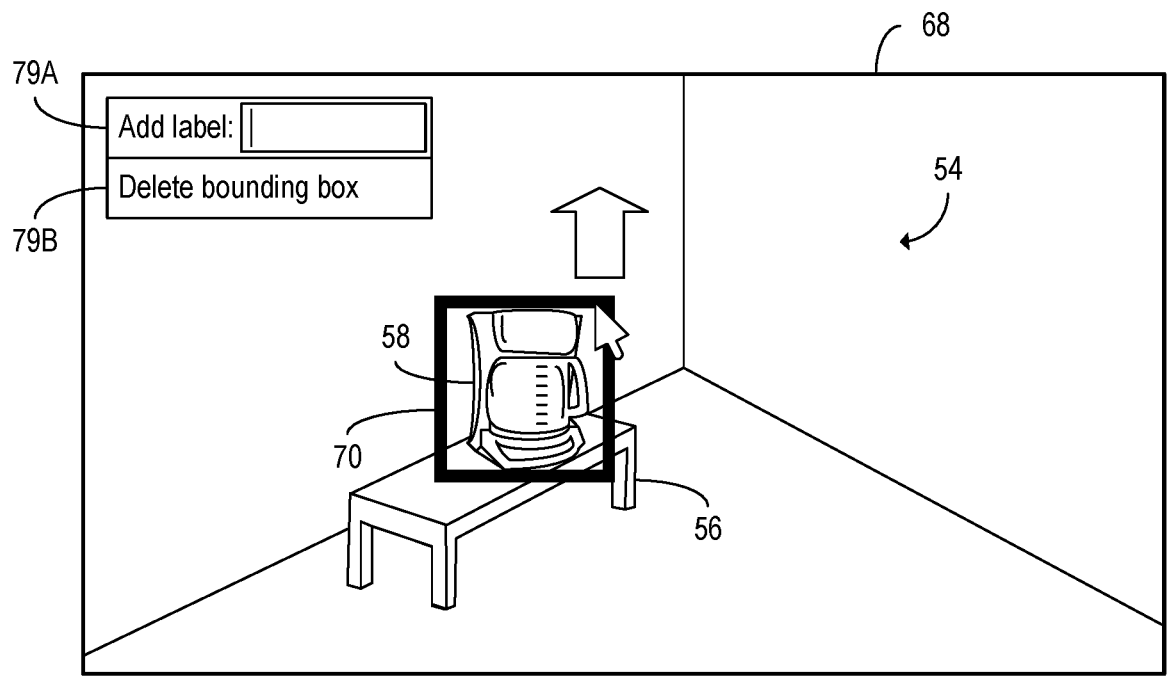
FIGS. 7A-B show an example of modifying a size and shape of a two-dimensional bounding shape, according to the example of FIG. 4.
Figure 7B:
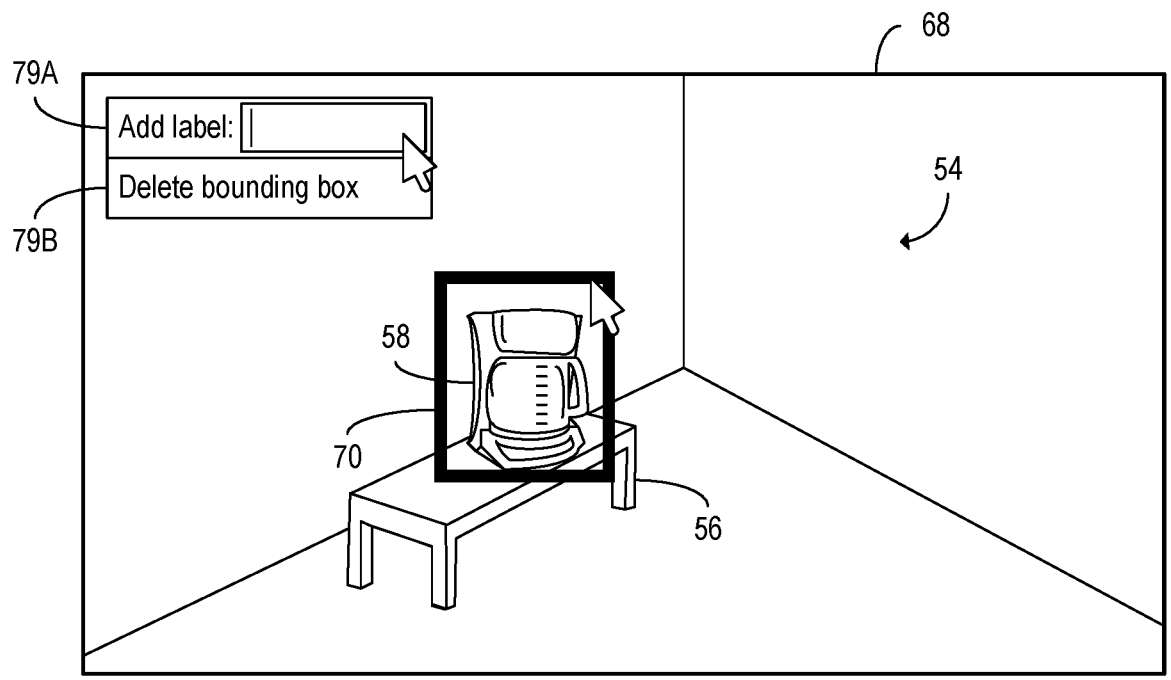

Additionally or alternatively, the two-dimensional bounding shape 70 may be modified based on the user input 78 at least in part by modifying the size 72 and/or shape 74 of the two-dimensional bounding shape. FIGS. 7A-B show an example in which the size 72 and shape 74 of the two-dimensional bounding shape 70 of FIG. 5 is modified. In FIG. 7A, the processor 12 receives a user input 78 dragging an upper edge of the two-dimensional bounding shape 70 upward. In response to the user input 78, as shown in FIG. 7B, the processor 12 modifies the size 72 and shape 74 of the two-dimensional bounding shape 70 by extending it upward. In addition, when the size 72 and/or shape 74 of the two-dimensional bounding shape 70 is modified, the processor 12 may be further configured to modify a size 62 and/or shape 64 of the three-dimensional bounding volume 60 based on the user input 78. The processor 12 may be configured to modify the three-dimensional bounding volume 60 to match the two-dimensional bounding shape 70.

Figure 8A:
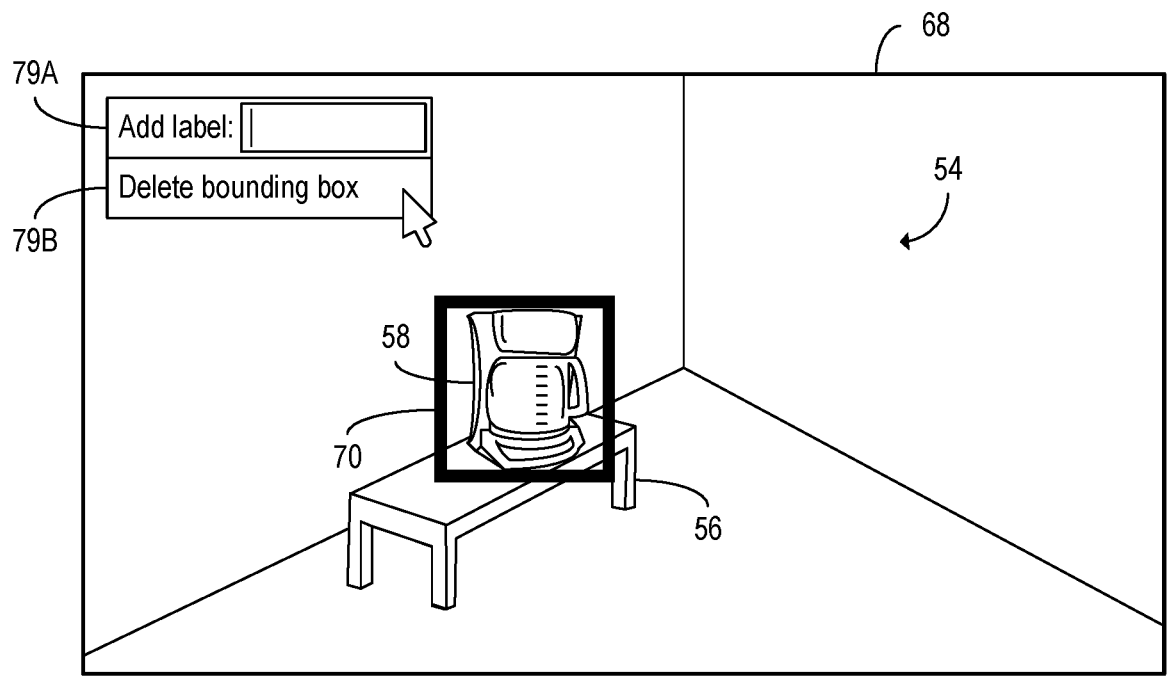
FIGS. 8A-B show an example of deleting a two-dimensional bounding shape, according to the example of FIG. 4.
Figure 8B:
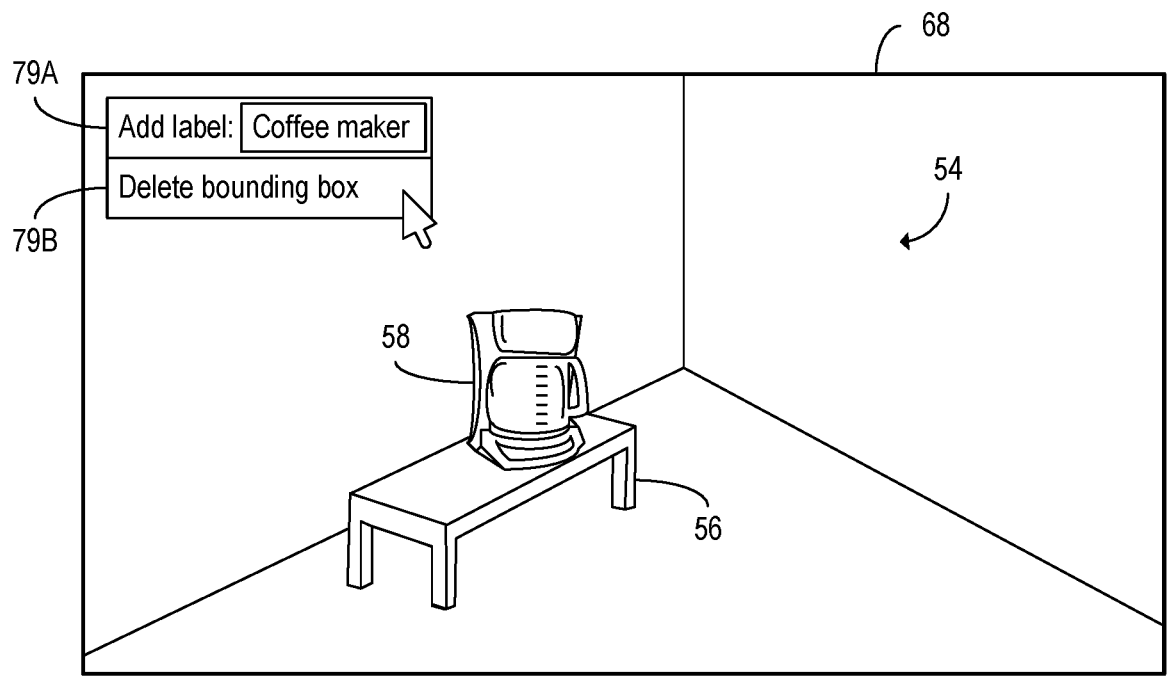

Alternatively, in response to the user input 78, the processor 12 may be configured to modify the two-dimensional bounding shape 70 at least in part by deleting the two-dimensional bounding shape 70. FIGS. 8A-B show an example in which the two-dimensional bounding shape 70 of FIG. 5 is deleted in response to a user input 78. In FIG. 8A, the processor 12 receives a user input 78 selecting a "Delete bounding box" menu item 79B. In response to the user input 78 selecting the "Delete bounding box" menu item 79B, the processor 12 deletes the two-dimensional bounding shape 70, as shown in FIG. 8B. When the two-dimensional bounding shape 70 is deleted, the processor 12 may be further configured to delete the three-dimensional bounding volume 60.

Figure 9A:
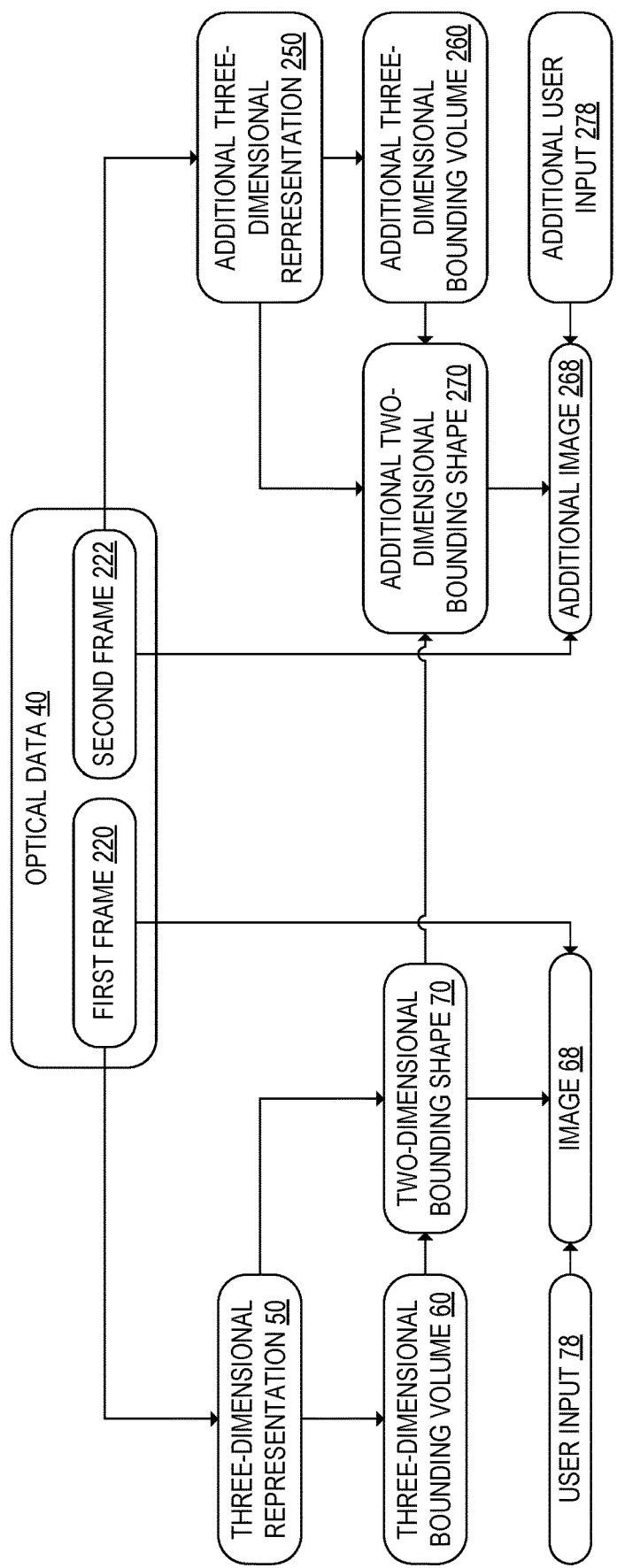
FIG. 9A shows example optical data including a first frame and a second frame, according to the embodiment of FIG. 1.

Turning now to FIG. 9A, in some embodiments, the optical data 40 may include a plurality of frames. In such embodiments, each frame included in the optical data 40 may include depth and/or color data for a plurality of vertices 82. FIG. 9A shows a first frame 220 and a second frame 222 of the optical data 40. However, it is understood that the optical data 40 may include more than two frames. As shown in FIG. 9A, the three-dimensional bounding volume 60 and the two-dimensional bounding shape 70 may be generated for the first frame 220 of the optical data 40 as discussed above with reference to FIG. 1. In addition, the processor 12 may be further configured to detect the target region in the second frame 222 of the optical data 40.

In some embodiments, the processor 12 may be configured to generate an additional three-dimensional representation 250 of the physical environment 54 as measured in the second frame 222 of the optical data 40. The processor 12 may, in some embodiments, be further configured to detect at least one physical object 56 in the additional three-dimensional representation 250 of the physical environment 54. The processor 12 may be further configured to generate an additional three-dimensional bounding volume 260 for at least one target region. The processor 12 may determine that the target region detected in the second frame 222 is the same region as the target region detected in the first frame 220. For example, the processor 12 may determine that the additional three-dimensional representation 250 includes an additional three-dimensional bounding volume 260 that is within a predetermined level of similarity to the three-dimensional bounding volume 60 of a target physical object 58 in the first frame 220. This similarity determination may be based at least in part on the respective depth profiles 66 of the three-dimensional bounding volume 60 and the additional three-dimensional bounding volume 260.

The processor 12 may be further configured to generate an additional two-dimensional bounding shape 270. The additional two-dimensional bounding shape 270 may be generated based at least in part on the additional three-dimensional bounding volume 260. In addition, the two-dimensional bounding shape 270 may be generated based at least in part on the additional three-dimensional bounding volume 260. In addition, the additional two-dimensional bounding shape 270 may be generated based at least in part on the two-dimensional bounding shape 70 from the first frame 220. For example, the processor 12 may copy the two-dimensional bounding shape 70 from the first frame 220 and may further modify the two-dimensional bounding shape 70 based on the additional three-dimensional bounding volume 260 to generate the additional two-dimensional bounding shape 270. In embodiments in which the two-dimensional bounding shape 70 is modified in response to a user input 78, changes to the two-dimensional bounding shape 70 made in response to the user input 78 may be carried over to the additional two-dimensional bounding shape.

The processor 12 may be further configured to generate, based on the second frame 222 of the optical data 40, an additional image 268 of the physical environment 54 and the additional two-dimensional bounding shape 270. The processor 12 may be further configured to store the additional image 268 in the memory 14. The processor 12 may also output additional image 268 for display on the display 32. As with the two-dimensional bounding shape 70 of the first frame 220, the processor 12 may be further configured to receive an additional user input 278 via the one or more input devices and modify the additional two-dimensional bounding shape 270 based on the additional user input 278. Similarly to the user input 78 to modify the two-dimensional bounding shape 70, the additional user input 278 may add, remove, or modify a label, modify a size and/or shape of the additional two-dimensional bounding shape 270, or delete the additional two-dimensional bounding shape 270, as shown in FIGS. 6A-8B.

Figure 9B:
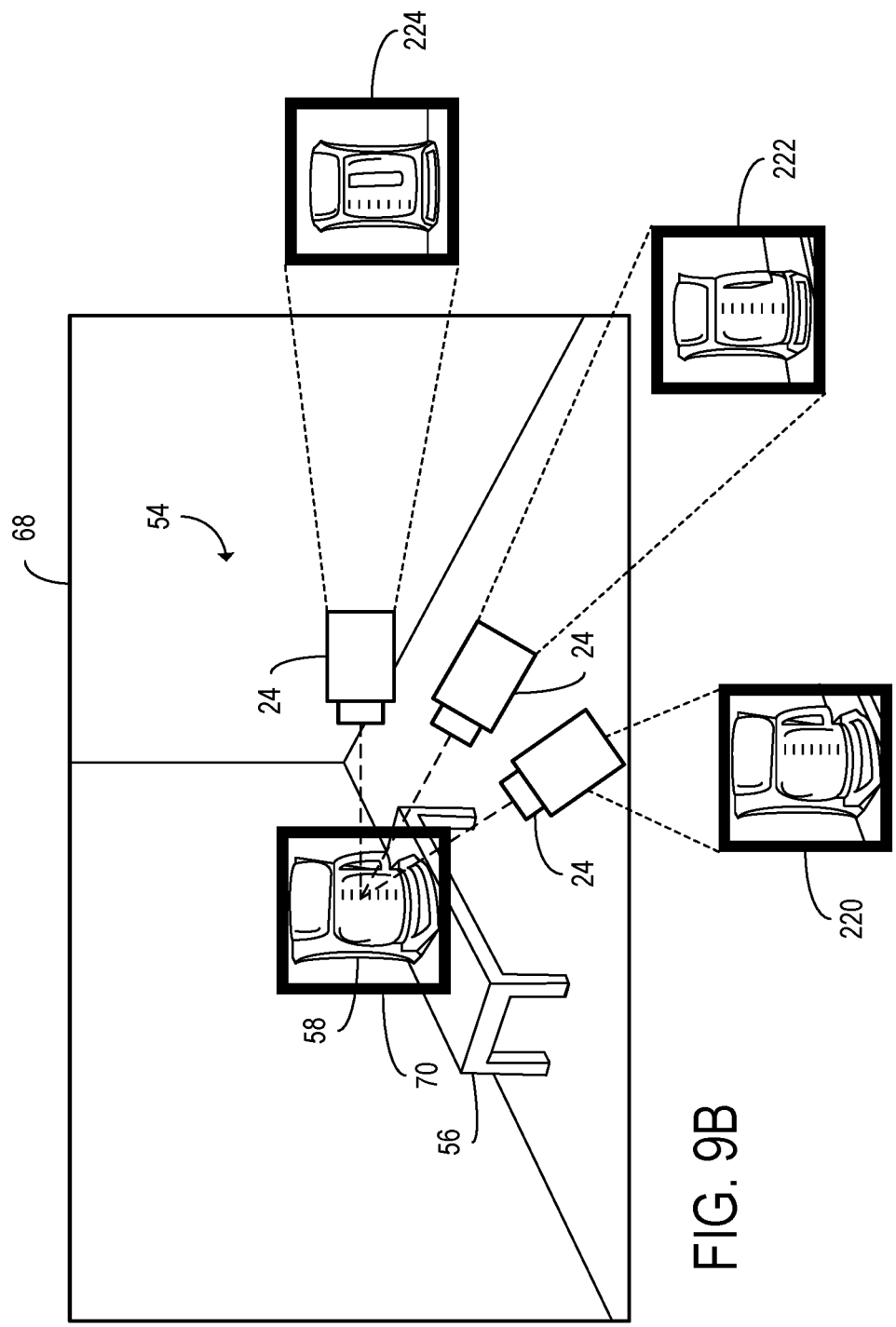
FIG. 9B shows an example of viewing a target physical object from a plurality of different camera poses, according to the example of FIG. 4.

Although FIG. 9A shows only a first frame 220 and a second frame 222, the processor 12 may be configured to generate images for more than two frames. FIG. 9B shows the example physical environment 54 of FIG. 4 when the coffee maker is imaged from three different camera poses. In the example of FIG. 9B, the three different camera poses are poses of the visible light camera 24 in a first frame 220, a second frame 222, and a third frame 224. In each of the first frame 220, the second frame 222, and the third frame 224, the visible light camera 24 has a different camera angle with respect to the coffee maker. The processor 12 may generate additional images 268 for both the second frame 222 and the third frame 224 as discussed above with reference to FIG. 9A. Imaging the target physical object 58 from a plurality of different camera poses may be useful, for example, when generating training data to train a machine learning algorithm to recognize objects from multiple different angles. While three frames are illustrated in FIG. 9B it will be understood that images of the target physical object 58 from more than three frames captured at different camera angles may also be generated. The camera angle, expressed in six degrees of freedom (6 DOF) including x, y, z, pitch, yaw, and roll in world space, of each image of the target physical object 58 may be stored as metadata associated with the image. In this manner, image sets that span a particular range of camera angles may be defined.

Figure 10A:
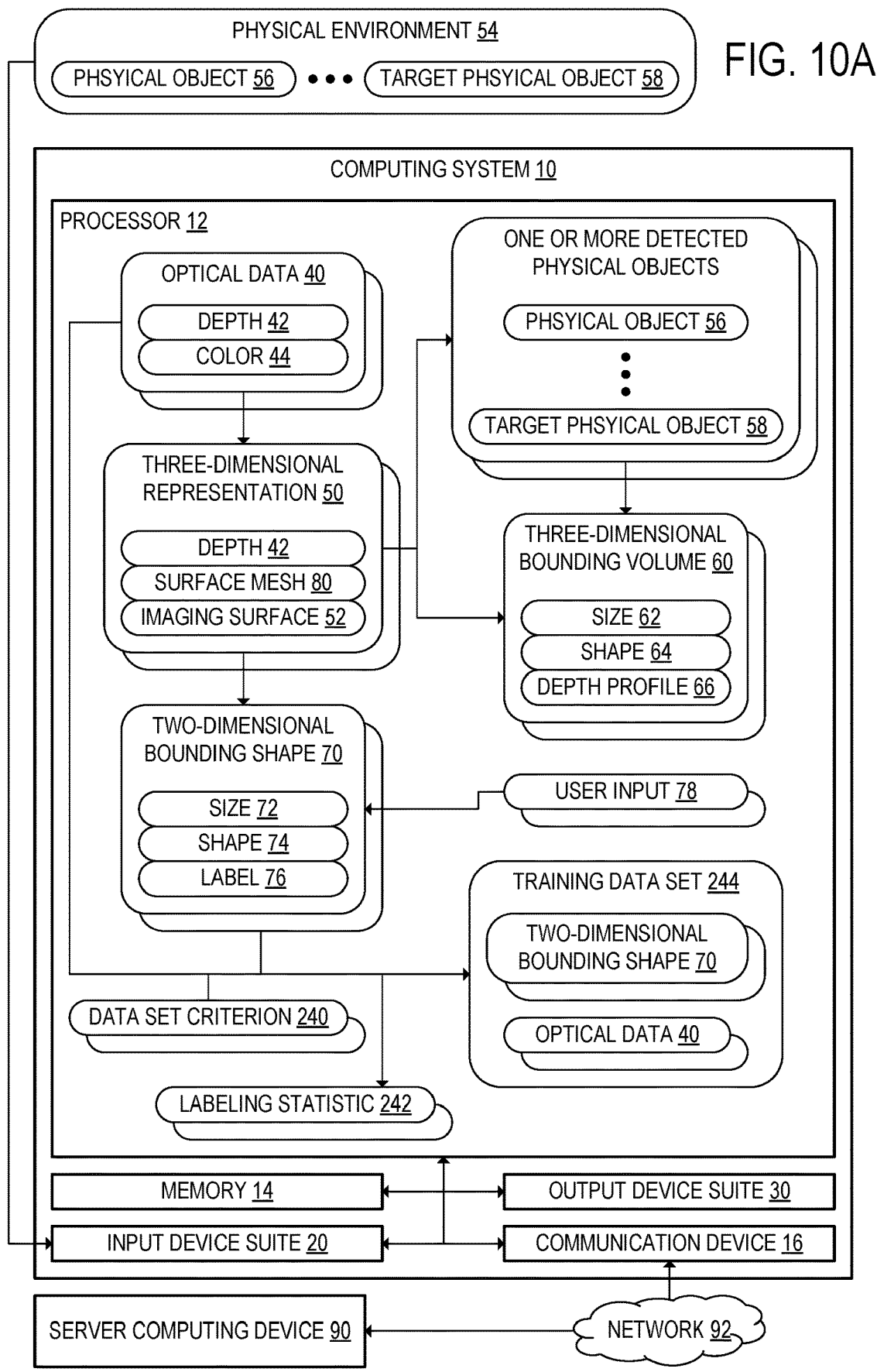
FIG. 10A shows the example computing system of FIG. 1 when the processor is configured to generate a training data set.

FIG. 10A shows the computing system 10 in an example in which the processor 12 generates a training data set 244, as discussed in further detail below. As shown in the example of FIG. 10A, the processor 12 may be configured to generate a plurality of two-dimensional bounding shapes 70 for a respective plurality of target regions. The plurality of target regions may be found in one frame or may be distributed across a plurality of frames. As shown in FIG. 10A, the respective two-dimensional bounding shape 70 of each target region may be generated as discussed above with reference to FIG. 1. The processor 12 may be further configured to receive one or more data set criteria 240. The one or more data set criteria 240 may be received via a user input 78. Additionally or alternatively, the one or more data set criteria 240 may be received from another computing system via the one or more communication devices 16.

The one or data set criteria 240 may specify one or more properties of the optical data 40, the three-dimensional bounding volume 60, and/or the two-dimensional bounding shape 70. For example, the one or more data set criteria 240 may specify that the plurality of two-dimensional bounding shapes 70 should all be above a predetermined threshold size. As another example, the one or more data set criteria 240 may specify that the respective depth profile 66 of each three-dimensional bounding volume 60 includes at least one right angle. In some embodiments, the one or more data set criteria 240 may include one or more criteria related to a plurality of labels 76 assigned to the plurality of two-dimensional bounding shapes 70. For example, the one or more data set criteria 240 may specify that the plurality of two-dimensional bounding shapes 70 should all include the word "behind." Additionally of alternatively, the one or more data set criteria 240 may specify that the training data set 244 should include optical data 40, three-dimensional bounding volumes 60, and/or two-dimensional bounding shapes with a predetermined mix of properties. For example, the one or more data set criteria 240 may specify that 50% of the plurality of two-dimensional bounding shapes 70 should be labeled "hot dog."

The processor 12 may be configured to generate one or more labeling statistics 242 that describe respective labels of the plurality of two-dimensional bounding shapes 70. For example, the one or more labeling statistics 242 may indicate, for each label 76, a number of two-dimensional bounding shapes 70 to which that label 76 is assigned. The one or more labeling statistics 242 may be output for display on the display 32. The processor 12 may be further configured to generate and output other statistics that describe the optical data 40, the plurality of three-dimensional bounding volumes 60, and/or the plurality of two-dimensional bounding shapes 70.

The processor 12 may be further configured to generate a training data set 244 including one or more two-dimensional bounding shapes 70 of the plurality of two-dimensional bounding shapes 70 that satisfy the one or more data set criteria 240. The training data set 244 may further include, for each of the one or more two-dimensional bounding shapes 70 that satisfy the one or more data set criteria 240, the respective optical data 40 from which that two-dimensional bounding shape 70 was generated. The training data set 244 may then be used to train a machine learning algorithm.

Figure 10B:
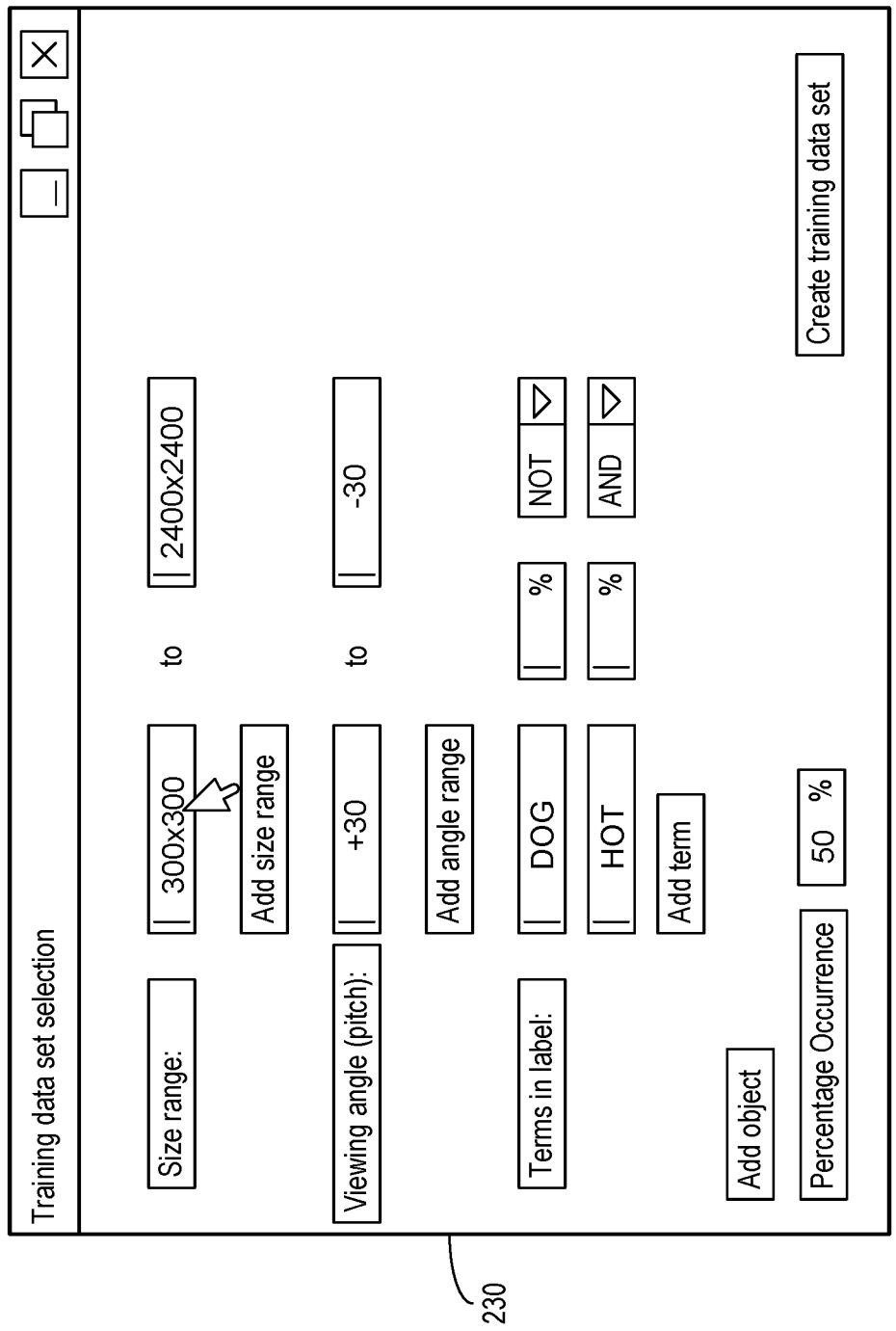
FIG. 10B shows an example graphical user interface (GUI) via which a user may select one or more data set criteria, according to the example of FIG. 10A.

FIG. 10B shows an example graphical user interface (GUI) 230 via which a user may enter data set criteria 240 for generating the training data set 244. In the example of FIG. 10B, the user may select a size range for the two-dimensional bounding shape 70. In the depicted example, images with bounding boxes that are between 300×300 and 2400×2400 pixels are selected. In addition, the user may select a viewing angle range (i.e., camera angle range) for the target physical object 58. In the depicted example, images captured with a camera angle pitch of +30 to −30 degrees relative to the target physical object 58 have been selected. It will be appreciated that GUI 230 may be used to select yaw and roll ranges. Further, although now shown, the relative x, y, z position of the camera relative to the target object may be selectable in some embodiments. In the depicted example, the user may also select one or more terms included in the label, which may be linked by logical connectives such as "and," "or," and "and not." For example, a user may indicate that at least a portion of the two-dimensional bounding shapes 270 in the training data set 244 should include the word "dog" but not the word "hot." In addition, for results matching all of the inputted size ranges, viewing angles, and label terms, the user may select a percentage of the training data set 244 that has that data set criterion 240 via a percentage selector. In the illustrated example, results matching all of the data set criteria 240 are selected to appear in 50% of the resulting training data set images. Alternatively, a percentage selector may be provided for each data set criterion 240 individually. Other data set criteria 240 may additionally or alternatively be selectable via the GUI 230 in other embodiments. For example, although not shown, the total number of images of each target physical object 58 may be selected as a data set criteria 240. It will be appreciated that using GUI 230, a user may select from among a vast catalog of images captured using the system described above, a subset of images to include in a training data set that meets the user's needs for a specific project.

Figure 11A:
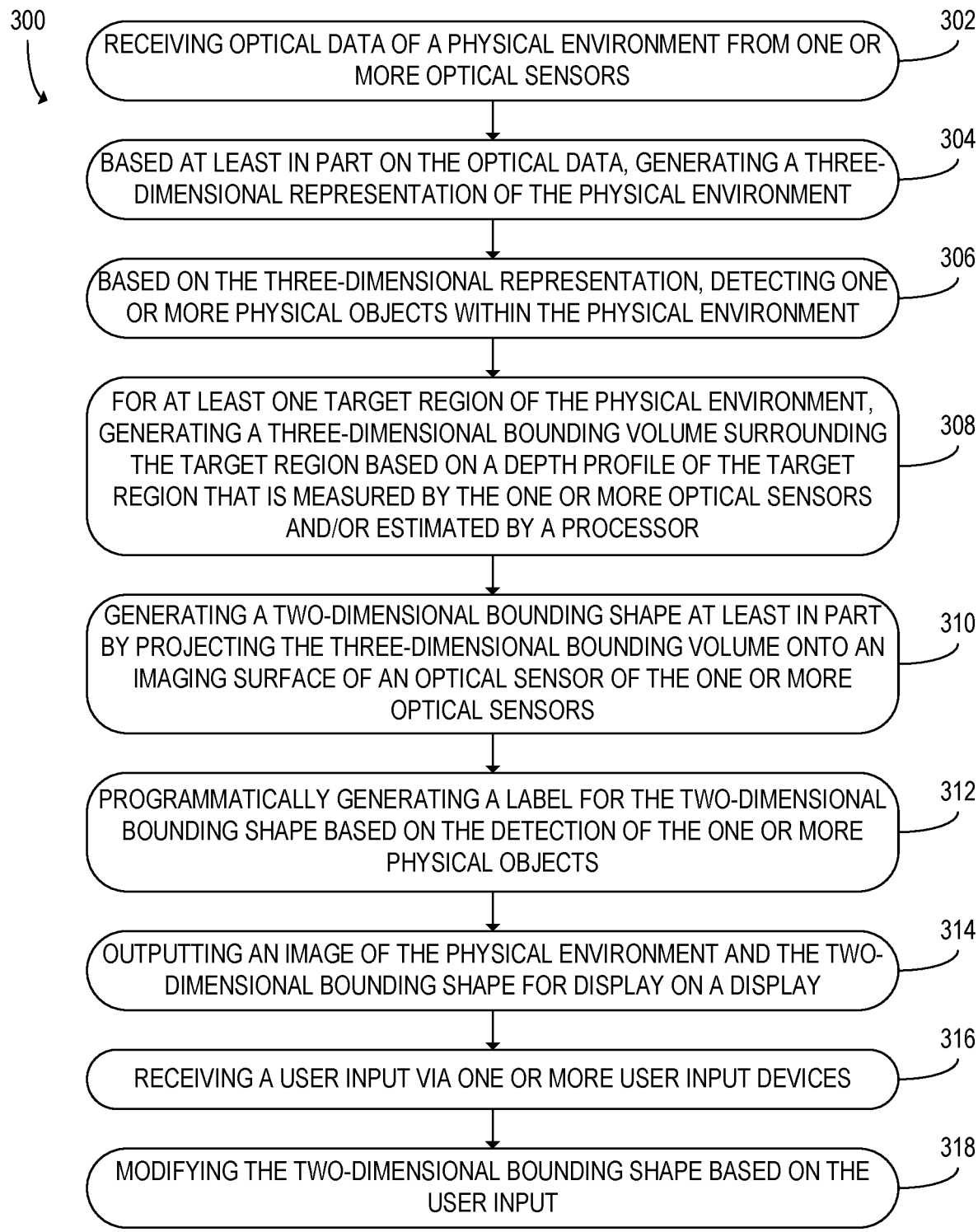
FIG. 11A shows a flowchart of an example method for use with a computing system, according to the embodiment of FIG. 1.

FIG. 11A shows a flowchart of an example method 300 for use with a computing system. The computing system with which the method 300 is used may be the computing system 10 of FIG. 1 or may alternatively be some other computing system. At step 302, the method 300 may include receiving optical data of a physical environment from one or more optical sensors. The optical data may include depth data and/or color data, which may be received from a depth camera and a visible light camera respectively. Other types of optical sensors may additionally or alternatively be used to collect the optical data.

At step 304, the method 300 may further include generating a three-dimensional representation of the physical environment based at least in part on the optical data. In some embodiments, the three-dimensional representation may include a surface mesh. The surface mesh may include a plurality of vertices connected by a plurality of edges, for example, to form a plurality of triangles. The one or more vertices of the surface mesh may each be associated with respective optical data. In some embodiments, at step 306, the method 300 may further include detecting one or more physical objects within the physical environment based on the three-dimensional representation. For example, in embodiments in which the three-dimensional representation of the physical environment includes a surface mesh, detecting the one or more physical objects may include grouping together a plurality of vertices in the surface mesh. The one or more physical objects may be detected using a machine learning algorithm.

At step 308, the method 300 may further include, for at least one target region of the physical environment, generating a three-dimensional bounding volume surrounding the target region. In embodiments in which step 306 is performed, the at least one target region may be a target object detected in the physical environment. The three-dimensional bounding volume may be generated based on a depth profile of the target region that characterizes a depth of the target region relative to the one or more optical sensors. The depth profile may be measured by the one or more optical sensors and/or estimated by a processor. In embodiments in which the three-dimensional representation of the physical environment includes a surface mesh, the depth profile may include a depth of at least one vertex included in the target region in the three-dimensional representation.

At step 310, the method 300 may further include generating a two-dimensional bounding shape for the target region. Generating the two-dimensional bounding shape may include projecting the three-dimensional bounding volume onto an imaging surface of an optical sensor of the one or more optical sensors. The imaging surface may be a virtual surface representing an area of the three-dimensional physical environment viewed by at the least one optical sensor that collects the optical data. In some embodiments, the shape of the two-dimensional bounding volume may be the shape of the three-dimensional bounding volume projected onto the imaging surface. In other embodiments, the two-dimensional bounding shape may have some other shape, such as a rectangle.

In embodiments in which step 306 is performed the method 300 may further include, at step 312, programmatically generating a label for the two-dimensional bounding shape based on the detection of the one or more physical objects. For example, the label may be programmatically generated based on the depth profile of the target physical object and/or color data associated with the target physical object. The label may be programmatically generated by a machine learning algorithm. At step 314, the method 300 may further include outputting an image of the physical environment and the two-dimensional bounding shape for display on a display. In embodiments in which a label is programmatically generated, the label may be included in the image. The image may further include one or more other virtual objects, such as one or more menu items.

Figure 11B:
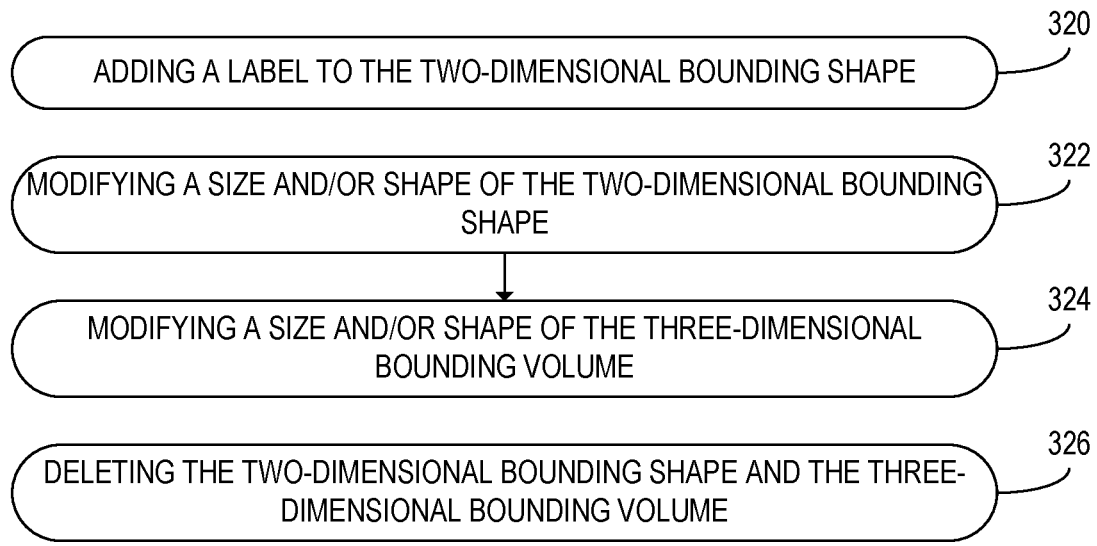
FIGS. 11B-D show additional steps that may optionally be performed when performing the method of FIG. 11A.

At step 316, the method 300 may further include receiving a user input via one or more user input devices. The user input may be an interaction with the two-dimensional bounding shape, the label, and/or the one or more other virtual objects. In response to receiving the user input, the method may further include, at step 318, modifying the two-dimensional bounding shape based on the user input. FIG. 11B shows additional steps of the method 300 that may be performed when the two-dimensional bounding shape is modified. At step 320, modifying the two-dimensional bounding shape may include adding a label to the two-dimensional bounding shape. In embodiments in which the label is programmatically generated, the method 300 may additionally or alternatively include modifying or deleting the label. At step 322, modifying the two-dimensional bounding shape may include modifying a size and/or shape of the two-dimensional bounding shape. When the size and/or shape of the two-dimensional bounding shape is modified, the method 300 may further include, at step 324, modifying a size and/or shape of the three-dimensional bounding volume. Alternatively, at step 326, modifying the two-dimensional bounding shape may include deleting the two-dimensional bounding shape and the three-dimensional bounding volume.

Figure 11C:
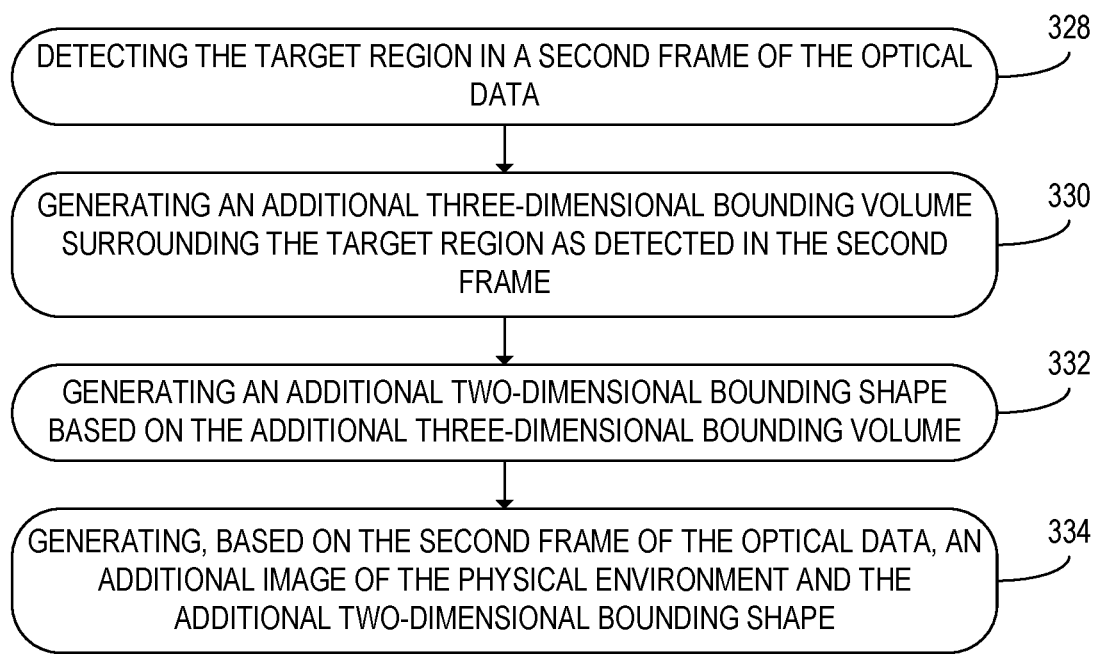

Additional steps of the method 300 that may be performed in some embodiments are shown in FIG. 11C. In embodiments in which the steps shown in FIG. 11C are performed, the optical data may include a plurality of frames, and the three-dimensional bounding volume and the two-dimensional bounding shape are generated for a first frame of the optical data. At step 328, the method 300 may further include detecting the target region in a second frame of the optical data. In embodiments in which step 306 is performed, the target region may be a target physical object. Step 328 may include determining that the target region in the second frame is the same region as the target region in the first frame. At step 330, the method 300 may further include generating an additional three-dimensional bounding volume surrounding the target region as detected in the second frame. The additional three-dimensional bounding volume may be generated based at least in part on an additional depth profile of the target region in the second frame. At step 332, the method 300 may further include generating an additional two-dimensional bounding shape based on the additional three-dimensional bounding volume. The additional two-dimensional bounding shape may be generated at least in part by projecting the additional three-dimensional bounding volume onto an additional imaging surface of an optical sensor of the one or more optical sensors as positioned and oriented in the physical environment in the second frame. At step 334, the method 300 may further include generating, based on the second frame of the optical data, an additional image of the physical environment and the additional two-dimensional bounding shape. The additional image may be stored in memory and/or output for display on the display. Thus, the target region may be tracked over a plurality of frames and may be displayed with a two-dimensional bounding shape for each frame of the plurality of frames. In some embodiments, a label associated with the two-dimensional bounding shape and/or one or more user modifications to the two-dimensional bounding shape may persist between frames.

Figure 11D:
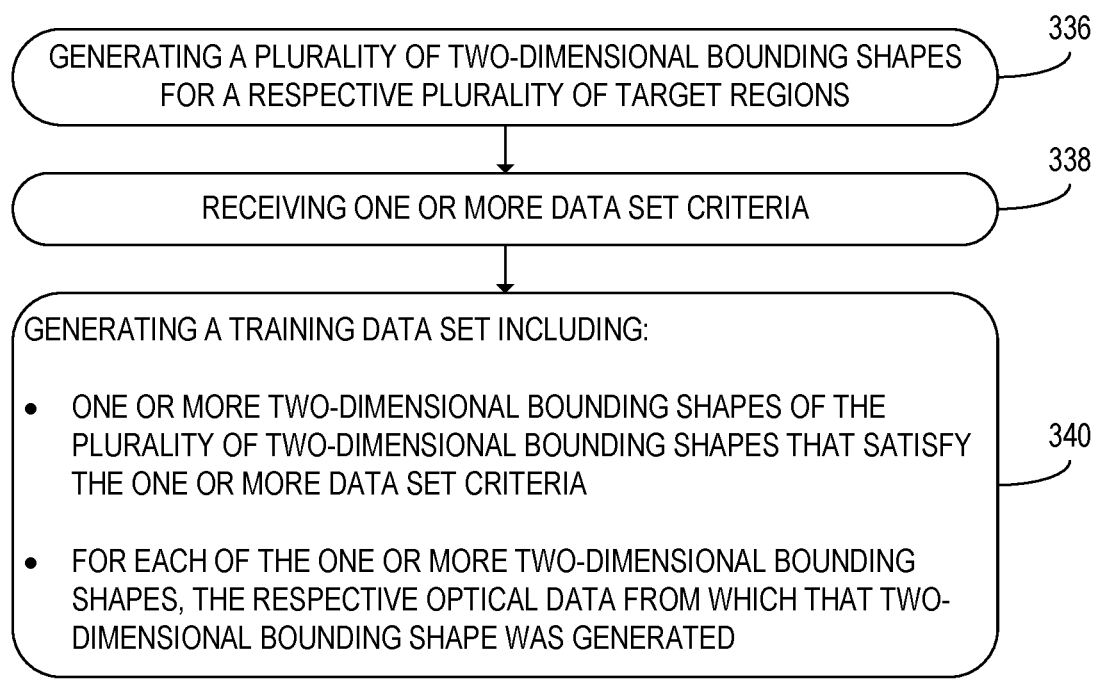

FIG. 11D shows additional steps of the method 300 that may be performed in some embodiments. At step 336, the method 300 may further include generating a plurality of two-dimensional bounding shapes for a respective plurality of target regions, such as a plurality of target physical objects. The two-dimensional bounding shapes may be generated as described above with reference to FIG. 11A. The two-dimensional bounding shapes may be included in one frame, or alternatively may be distributed across a plurality of frames. At step 338, the method 300 may further include receiving one or more data set criteria. The one or more data set criteria may specify one or more properties of the optical data, the three-dimensional bounding volume, and/or the two-dimensional bounding shape. At step 340, the method 300 may further include generating a training data set. The training data set may include one or more two-dimensional bounding shapes of the plurality of two-dimensional bounding shapes that satisfy the one or more data set criteria. The one or more two-dimensional bounding shapes may include respective labels. The training data set may further include, for each of the one or more two-dimensional bounding shapes, the respective optical data from which that two-dimensional bounding shape was generated. Thus, in some embodiments, the training data set may be a set of labeled images with properties specified by the one or more data set criteria.

In the following example, the systems and methods described above are used to generate a training data set for a machine learning algorithm. The data set criteria in this example specify that 50% of the images in the training data set should include stop signs. The data set criteria further specify that 50% of the stop signs should be at least 20% occluded. The optical data in this example is collected as the computing system travels through a city neighborhood and includes both depth and color data. For each frame of the optical data, the processor of the computing system generates a three-dimensional representation of the physical environment as imaged by the optical sensors included in the computing system. The three-dimensional representation of the physical environment includes a surface mesh including vertices and edges which the processor groups into detected physical objects. In addition, the processor generates a three-dimensional bounding volume surrounding each identified object.

The processor then determines an imaging surface for the optical sensors in each frame and generates a respective two-dimensional bounding shape from the three-dimensional bounding volume of each identified object. The two-dimensional bounding shape of each object is, in this example, the shape of the three-dimensional bounding volume projected onto the imaging surface. In addition, the processor programmatically generates a label for each two-dimensional bounding shape. The label for each object indicates whether that object is a stop sign, and if the object is a stop sign, what portion of the stop sign is occluded. The processor then outputs each frame of the optical data with the two-dimensional bounding shapes of the physical objects and the programmatically generated labels for display on the display of the computing system.

For each frame, the user may modify any of the two-dimensional bounding shapes occurring in that frame. For example, the user may relabel a "no parking" sign that is incorrectly labeled as a stop sign. When the user modifies a two-dimensional bounding shape in one frame, the modification is propagated to instances of the same object in other frames. When the user finishes modifying the two-dimensional bounding shapes, the processor generates a training data set that includes the two-dimensional bounding shapes and respective images for a plurality of frames. The training data set is generated such that 50% of the images included in the training data set include stop signs and 50% of the stop signs are at least 20% occluded.

As shown in the above example, the systems and methods described above allow customized training data sets for training machine learning algorithms to be generated from optical data more quickly and easily than previous systems and methods. Using the systems and methods described above, the training data set may be generated with fewer inputs from the user than would typically be required. Thus, the above systems and methods may reduce costs associated with applying machine learning techniques to specialized applications.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
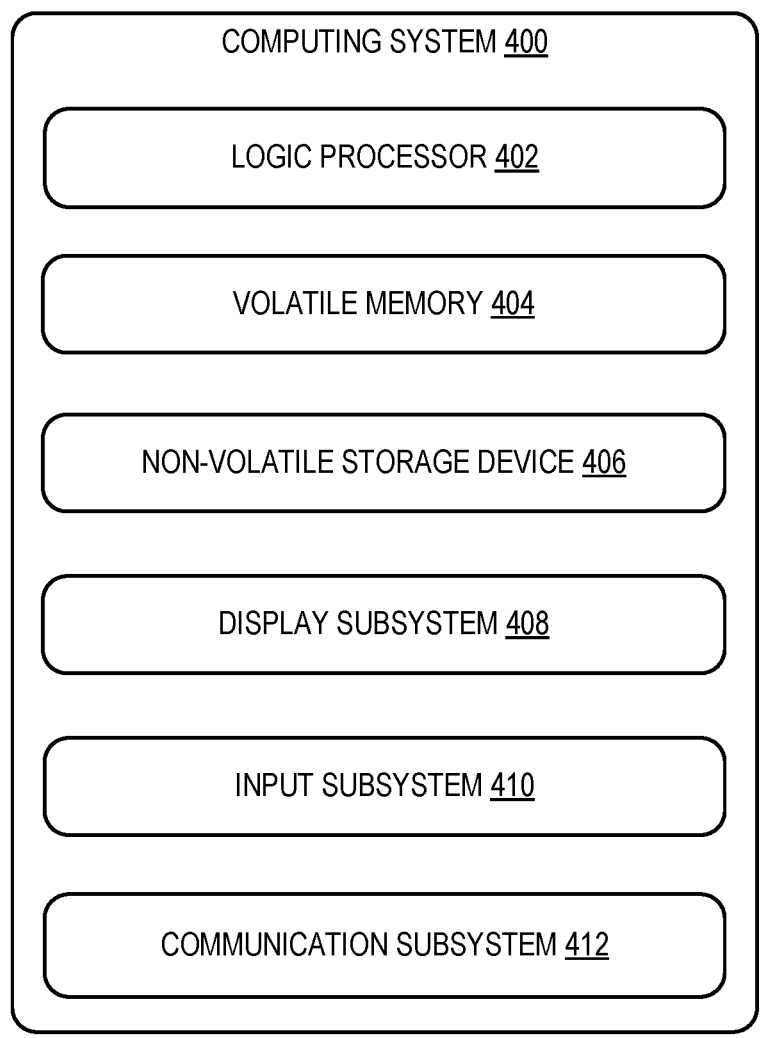
FIG. 12 shows a schematic view of an example computing environment in which the computer device of FIG. 1 may be enacted.

FIG. 12 schematically shows a non-limiting embodiment of a computing system 400 that can enact one or more of the methods and processes described above. Computing system 400 is shown in simplified form. Computing system 400 may embody the computing system 10 described above and illustrated in FIG. 1. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 12.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

According to one aspect of the present disclosure, a computing system is provided, including one or more optical sensors, a display, one or more user input devices, and a processor. The processor may be configured to receive optical data of a physical environment from the one or more optical sensors. For at least one target region of the physical environment, the processor may be further configured to generate a three-dimensional bounding volume surrounding the target region based on a depth profile of the target region that is measured by the one or more optical sensors and/or estimated by the processor. The processor may be further configured to generate a two-dimensional bounding shape at least in part by projecting the three-dimensional bounding volume onto an imaging surface of an optical sensor of the one or more optical sensors. The processor may be further configured to output an image of the physical environment and the two-dimensional bounding shape for display on the display. The processor may be further configured to receive a user input via the one or more user input devices. The processor may be further configured to modify the two-dimensional bounding shape based on the user input.

According to this aspect, the one or more optical sensors may include a depth camera. The depth profile of the target region may be measured by the depth camera.

According to this aspect, the one or more optical sensors may include a visible light camera.

According to this aspect, the two-dimensional bounding shape may be modified based on the user input at least in part by adding a label to the two-dimensional bounding shape.

According to this aspect, the two-dimensional bounding shape may be modified based on the user input at least in part by modifying a size and/or shape of the two-dimensional bounding shape.

According to this aspect, the processor may be further configured to modify a size and/or shape of the three-dimensional bounding volume based on the user input.

According to this aspect, the two-dimensional bounding shape may be modified based on the user input at least in part by deleting the two-dimensional bounding shape and the three-dimensional bounding volume.

According to this aspect, the three-dimensional representation of the physical environment may include a surface mesh.

According to this aspect, the optical data may include a plurality of frames. The three-dimensional bounding volume and the two-dimensional bounding shape may be generated for a first frame of the optical data. The processor may be further configured to detect the target region in a second frame of the optical data. The processor may be further configured to generate an additional three-dimensional bounding volume surrounding the target region as detected in the second frame. The processor may be further configured to generate an additional two-dimensional bounding shape based on the additional three-dimensional bounding volume. The processor may be further configured to generate, based on the second frame of the optical data, an additional image of the physical environment and the additional two-dimensional bounding shape.

According to this aspect, the processor may be further configured to, based on the three-dimensional representation, detect one or more physical objects within the physical environment.

According to this aspect, the processor may be further configured to programmatically generate a label for the two-dimensional bounding shape based on the detection of the one or more physical objects.

According to this aspect, the processor may be further configured to generate a plurality of two-dimensional bounding shapes for a respective plurality of target regions of the physical environment. The processor may be further configured to receive one or more data set criteria. The processor may be further configured to generate a training data set including one or more two-dimensional bounding shapes of the plurality of two-dimensional bounding shapes that satisfy the one or more data set criteria. The training data set may further include, for each of the one or more two-dimensional bounding shapes, the respective optical data from which that two-dimensional bounding shape was generated.

According to this aspect, the computing system may include a head-mounted display device.

According to another aspect of the present disclosure, a method performed at a computing system is provided. The method may include receiving optical data of a physical environment from one or more optical sensors. The method may further include, based at least in part on the optical data, generating a three-dimensional representation of the physical environment. The method may further include, for at least one target region of the physical environment, generating a three-dimensional bounding volume surrounding the target region based on a depth profile of the target region that is measured by the one or more optical sensors and/or estimated by a processor. The method may further include generating a two-dimensional bounding shape at least in part by projecting the three-dimensional bounding volume onto an imaging surface of an optical sensor of the one or more optical sensors. The method may further include outputting an image of the physical environment and the two-dimensional bounding shape for display on a display. The method may further include receiving a user input via one or more user input devices. The method may further include modifying the two-dimensional bounding shape based on the user input.

According to this aspect, modifying the two-dimensional bounding shape may include adding a label to the two-dimensional bounding shape.

According to this aspect, modifying the two-dimensional bounding shape may include modifying a size and/or shape of the two-dimensional bounding shape.

According to this aspect, the optical data may include a plurality of frames. The three-dimensional bounding volume and the two-dimensional bounding shape may be generated for a first frame of the optical data. The method may further include detecting the target region in a second frame of the optical data. The method may further include generating an additional three-dimensional bounding volume surrounding the target region as detected in the second frame. The method may further include generating an additional two-dimensional bounding shape based on the additional three-dimensional bounding volume. The method may further include generating, based on the second frame of the optical data, an additional image of the physical environment and the additional two-dimensional bounding shape.

According to this aspect, the method may further include, based on the three-dimensional representation, detecting one or more physical objects within the physical environment.

According to this aspect, the method may further include generating a plurality of two-dimensional bounding shapes for a respective plurality of target regions. The method may further include receiving one or more data set criteria. The method may further include generating a training data set including one or more two-dimensional bounding shapes of the plurality of two-dimensional bounding shapes that satisfy the one or more data set criteria. The training data set may further include, for each of the one or more two-dimensional bounding shapes, the respective optical data from which that two-dimensional bounding shape was generated.

According to another aspect of the present disclosure, a computing system is provided, including one or more optical sensors, a display, one or more user input devices, and a processor. The processor may be configured to receive optical data of a physical environment from the one or more optical sensors. The optical data may include a plurality of frames of a video. For each frame of the plurality of frames, the processor may be further configured to generate a three-dimensional representation of the physical environment. For at least one target region of the physical environment, the processor may be further configured to generate a three-dimensional bounding volume surrounding the target region based on a depth profile of the target region that is measured by the one or more optical sensors and/or estimated by the processor. The processor may be further configured to generate a two-dimensional bounding shape at least in part by projecting the three-dimensional bounding volume onto an imaging surface of an optical sensor of the one or more optical sensors. The processor may be further configured to output an image of the physical environment and the two-dimensional bounding shape for display on the display. For at least one frame of the plurality of frames, the processor may be further configured to receive a user input via the one or more user input devices. The processor may be further configured to modify the respective two-dimensional bounding shape included in the at least one frame based on the user input.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
   one or more optical sensors;
   a display;
   one or more user input devices; and
   a processor configured to:
   receive optical data of a physical environment from the one or more optical sensors;
   based at least in part on the optical data, generate a three-dimensional representation of the physical environment;
   for at least one target region of the physical environment, generate a three-dimensional bounding volume surrounding the target region based on a depth profile of the target region that is measured by the one or more optical sensors and/or estimated by the processor;
   generate a current two-dimensional bounding shape at least in part by projecting the three-dimensional bounding volume onto a virtual imaging surface representing an area of the physical environment viewed by an optical sensor of the one or more optical sensors;
   output an image of the physical environment and the current two-dimensional bounding shape for display on the display;
   receive a user input via the one or more user input devices;
   modify the current two-dimensional bounding shape based on the user input at least in part by adding a label to, or modifying a label of, the current two-dimensional bounding shape; and
   propagate the label to one or more additional two-dimensional bounding shapes generated for different frames that include respective different views of the target region, wherein the different views of the target region are identified based on respective similarities between one or more other depth profiles associated with the one or more additional two-dimensional bounding shapes and the depth profile of the current two-dimensional bounding shape.

2. The computing system of claim 1, wherein:
   the one or more optical sensors include a depth camera; and
   the depth profile of the target region is measured by the depth camera.

3. The computing system of claim 1, wherein the one or more optical sensors include a visible light camera.

4. The computing system of claim 1, wherein the current two-dimensional bounding shape is modified based on the user input at least in part by adding the label to the current two-dimensional bounding shape.

5. The computing system of claim 1, wherein the current two-dimensional bounding shape is modified based on the user input at least in part by modifying a size and/or shape of the current two-dimensional bounding shape.

6. The computing system of claim 5, wherein the processor is further configured to modify a size and/or shape of the three-dimensional bounding volume based on the user input.

7. The computing system of claim 1, wherein the current two-dimensional bounding shape is modified based on the user input at least in part by deleting the current two-dimensional bounding shape and the three-dimensional bounding volume.

8. The computing system of claim 1, wherein the three-dimensional representation of the physical environment includes a surface mesh.

9. The computing system of claim 1, wherein:
   the three-dimensional bounding volume and the current two-dimensional bounding shape are generated for a first frame of the different frames of the optical data; and
   the processor is further configured to:
   detect the target region in a second frame of the optical data;
   generate an additional three-dimensional bounding volume surrounding the target region as detected in the second frame;
   generate the additional two-dimensional bounding shape based on the additional three-dimensional bounding volume; and
   generate, based on the second frame of the optical data, an additional image of the physical environment and the additional two-dimensional bounding shape.

10. The computing system of claim 1, wherein the processor is further configured to, based on the three-dimensional representation, detect one or more physical objects within the physical environment.

11. The computing system of claim 1, wherein the processor is further configured to programmatically generate a label for the current two-dimensional bounding shape based on the detection of the one or more physical objects.

12. The computing system of claim 1, wherein the processor is further configured to:
    generate a plurality of two-dimensional bounding shapes for a respective plurality of target regions of the physical environment;
    receive one or more data set criteria; and
    generate a training data set including:
    one or more two-dimensional bounding shapes of the plurality of two-dimensional bounding shapes that satisfy the one or more data set criteria; and
    for each of the one or more two-dimensional bounding shapes, the respective optical data from which that two-dimensional bounding shape was generated.

13. The computing system of claim 1, wherein the computing system includes a head-mounted display device.

14. A method performed at a computing system, the method comprising:
    receiving optical data of a physical environment from one or more optical sensors;
    based at least in part on the optical data, generating a three-dimensional representation of the physical environment;
    for at least one target region of the physical environment, generating a three-dimensional bounding volume surrounding the target region based on a depth profile of the target region that is measured by the one or more optical sensors and/or estimated by a processor;
    generating a current two-dimensional bounding shape at least in part by projecting the three-dimensional bounding volume onto a virtual imaging surface representing an area of the physical environment viewed by an optical sensor of the one or more optical sensors;
    outputting an image of the physical environment and the current two-dimensional bounding shape for display on a display;
    receiving a user input via one or more user input devices;
    modifying the current two-dimensional bounding shape based on the user input at least in part by adding a label to, or modifying a label of, the current two-dimensional bounding shape; and
    propagating the label to one or more additional two-dimensional bounding shapes generated for different frames that include respective different views of the target region, wherein the different views of the target region are identified based on respective similarities between one or more other depth profiles associated with the one or more additional two-dimensional bounding shapes and the depth profile of the current two-dimensional bounding shape.

15. The method of claim 14, wherein modifying the current two-dimensional bounding shape includes adding the label to the current two-dimensional bounding shape.

16. The method of claim 14, wherein modifying the current two-dimensional bounding shape includes modifying a size and/or shape of the current two-dimensional bounding shape.

17. The method of claim 14, wherein:
the three-dimensional bounding volume and the current two-dimensional bounding shape are generated for a first frame of the optical data; and
the method further includes:
  detecting the target region in a second frame of the different frames of the optical data;
  generating an additional three-dimensional bounding volume surrounding the target region as detected in the second frame;
  generating the additional two-dimensional bounding shape based on the additional three-dimensional bounding volume; and
  generating, based on the second frame of the optical data, an additional image of the physical environment and the additional two-dimensional bounding shape.

18. The method of claim 14, further comprising, based on the three-dimensional representation, detecting one or more physical objects within the physical environment.

19. The method of claim 14, further comprising:
generating a plurality of two-dimensional bounding shapes for a respective plurality of target regions;
receiving one or more data set criteria; and
generating a training data set including:
  one or more two-dimensional bounding shapes of the plurality of two-dimensional bounding shapes that satisfy the one or more data set criteria; and
  for each of the one or more two-dimensional bounding shapes, the respective optical data from which that two-dimensional bounding shape was generated.

20. A computing system comprising:
one or more optical sensors;
a display;
one or more user input devices; and
a processor configured to:
  receive optical data of a physical environment from the one or more optical sensors, wherein the optical data includes a plurality of frames of a video;
  for each frame of the plurality of frames:
    generate a three-dimensional representation of the physical environment;
    for at least one target region of the physical environment, generate a three-dimensional bounding volume surrounding the target region based on a depth profile of the target region that is measured by the one or more optical sensors and/or estimated by the processor;
    generate a current two-dimensional bounding shape at least in part by projecting the three-dimensional bounding volume onto a virtual imaging surface representing an area of the physical environment viewed by an optical sensor of the one or more optical sensors;
    output an image of the physical environment and the current two-dimensional bounding shape for display on the display;
  for at least one frame of the plurality of frames, receive a user input via the one or more user input devices;
  modify the current two-dimensional bounding shape included in the at least one frame based on the user input at least in part by adding a label to, or modifying a label of, the current two-dimensional bounding shape; and
  propagate the label to one or more additional two-dimensional bounding shapes generated for different frames that include respective different views of the target region, wherein the different views of the target region are identified based on respective similarities between one or more other depth profiles associated with the one or more additional two-dimensional bounding shapes and the depth profile of the current two-dimensional bounding shape.

* * * * *